US010820199B2

(12) United States Patent
Gerszewski et al.

(10) Patent No.: US 10,820,199 B2
(45) Date of Patent: Oct. 27, 2020

(54) MOBILE DEVICE WITH CONTRACTOR ACCESSIBLE SCREENS FOR CONFIGURING A BUILDING DEVICE

(71) Applicant: Ademco Inc., Golden Valley, MN (US)

(72) Inventors: Riley Gerszewski, Maple Grove, MN (US); Preston Gilmer, Delano, MN (US); David Quam, Golden Valley, MN (US); George Mcleod, Polmont (GB); Sriharsha Putrevu, Maple Grove, MN (US)

(73) Assignee: Ademco Inc., Golden Valley, MN (US)

( * ) Notice: Subject to any disclaimer, the term of this patent is extended or adjusted under 35 U.S.C. 154(b) by 117 days.

(21) Appl. No.: 15/045,093

(22) Filed: Feb. 16, 2016

(65) Prior Publication Data
US 2017/0234566 A1    Aug. 17, 2017

(51) Int. Cl.
| H04W 12/06 | (2009.01) |
| F24F 11/30 | (2018.01) |
| G06F 21/60 | (2013.01) |
| G05B 15/02 | (2006.01) |
| H04W 4/33 | (2018.01) |
| G05B 19/042 | (2006.01) |
| H04W 84/12 | (2009.01) |

(52) U.S. Cl.
CPC ............ *H04W 12/06* (2013.01); *F24F 11/30* (2018.01); *G05B 15/02* (2013.01); *G05B 19/042* (2013.01); *G06F 21/604* (2013.01); *H04W 4/33* (2018.02); *G05B 2219/2614* (2013.01); *G06F 2221/2117* (2013.01); *H04W 84/12* (2013.01)

(58) Field of Classification Search
CPC ....... F24F 11/30; G05B 15/02; G05B 19/042; G05B 2219/2614; H04L 67/025; H04W 4/33; H04W 12/06; H04W 84/12
See application file for complete search history.

(56) References Cited

U.S. PATENT DOCUMENTS

| 1,760,820 | A | 5/1930 | Drew |
| 6,496,575 | B1 | 12/2002 | Vasell et al. |
| 6,574,581 | B1 | 6/2003 | Bohrer et al. |
| 6,975,958 | B2 | 12/2005 | Bohrer et al. |
| 7,054,822 | B2 | 5/2006 | McCall |

(Continued)

FOREIGN PATENT DOCUMENTS

| AU | 2010333708 | 6/2011 |
| CN | 101192279 A | 6/2008 |
| WO | WO 2013/112574 | 8/2013 |

OTHER PUBLICATIONS

Proliphix "Proliphix Installer Remote Management," pp. 1-21, 2008.*

(Continued)

*Primary Examiner* — Harry W Byrne
*Assistant Examiner* — R Lance Reidlinger
(74) *Attorney, Agent, or Firm* — Shumaker & Sieffert, P.A.

(57) ABSTRACT

The present disclosure relates generally to systems, methods and tools for coordinating the activities of a contractor and a user during a setup process of a building control system. In some instances, an application program for a mobile device may provide contractors and users with different user experiences when configuring a building device, where the contractor is provided with additional features and functionality.

13 Claims, 29 Drawing Sheets

(56) References Cited

U.S. PATENT DOCUMENTS

| | | | |
|---|---|---|---|
| 7,114,554 B2 | 10/2006 | Bergman et al. | |
| 7,131,582 B2 | 11/2006 | Welton | |
| 7,337,191 B2 | 2/2008 | Haeberle et al. | |
| 7,346,467 B2 | 3/2008 | Bohrer et al. | |
| 7,571,865 B2 | 8/2009 | Nicodem et al. | |
| 7,636,604 B2 | 12/2009 | Bergman et al. | |
| 7,653,443 B2 | 1/2010 | Flohr | |
| 7,693,582 B2 | 4/2010 | Bergman et al. | |
| 7,703,694 B2 | 4/2010 | Mueller et al. | |
| 7,784,291 B2 | 8/2010 | Butler et al. | |
| 7,788,936 B2 | 9/2010 | Peterson et al. | |
| 7,845,576 B2 | 12/2010 | Siddaramanna et al. | |
| 7,877,305 B2 | 1/2011 | Gross et al. | |
| 8,001,219 B2 | 8/2011 | Moorer et al. | |
| 8,090,675 B2 | 1/2012 | Chambers et al. | |
| 8,200,527 B1 | 6/2012 | Thompson et al. | |
| 8,204,758 B2 | 6/2012 | McCall, Jr. | |
| 8,219,251 B2 | 7/2012 | Amundson et al. | |
| 8,239,066 B2 | 8/2012 | Jennings et al. | |
| 8,239,922 B2 | 8/2012 | Sullivan et al. | |
| 8,321,188 B2 | 11/2012 | Johnson et al. | |
| 8,332,178 B2 | 12/2012 | Simons | |
| 8,554,376 B1 | 10/2013 | Matsuoka et al. | |
| 8,620,632 B2 | 12/2013 | An et al. | |
| 8,756,024 B2 | 6/2014 | Hedley et al. | |
| 8,826,165 B2 | 9/2014 | Harrod et al. | |
| 8,862,415 B1 | 10/2014 | Adams | |
| 9,002,526 B2 | 4/2015 | Matsuoka et al. | |
| 9,069,338 B2 | 6/2015 | Drees et al. | |
| 9,629,269 B2 | 4/2017 | Goodsell | |
| 2002/0005435 A1* | 1/2002 | Cottrell | G05D 23/1904 236/46 R |
| 2002/0087332 A1 | 7/2002 | Como | |
| 2002/0152298 A1 | 10/2002 | Kikta et al. | |
| 2007/0232288 A1 | 10/2007 | McFarland et al. | |
| 2009/0140056 A1* | 6/2009 | Leen | G05B 13/02 236/49.3 |
| 2009/0240377 A1* | 9/2009 | Batzler | G05B 23/0216 700/287 |
| 2010/0127889 A1 | 5/2010 | Vogel et al. | |
| 2011/0190910 A1 | 8/2011 | Lombard et al. | |
| 2012/0005590 A1 | 1/2012 | Lombard et al. | |
| 2012/0016779 A1 | 1/2012 | Landry et al. | |
| 2012/0176252 A1 | 7/2012 | Drew et al. | |
| 2012/0191607 A1 | 7/2012 | Lord et al. | |
| 2012/0203586 A1 | 8/2012 | Blakely | |
| 2012/0221150 A1 | 8/2012 | Arensmeier | |
| 2013/0138475 A1 | 5/2013 | Allison et al. | |
| 2013/0332306 A1 | 12/2013 | Fahmy et al. | |
| 2014/0039697 A1* | 2/2014 | Weiler | H04L 63/102 700/284 |
| 2014/0074730 A1 | 3/2014 | Arensmeier et al. | |
| 2014/0172479 A1 | 6/2014 | Gallagher et al. | |
| 2014/0266755 A1 | 9/2014 | Arensmeier et al. | |
| 2014/0277795 A1 | 9/2014 | Matsuoka et al. | |
| 2014/0278681 A1 | 9/2014 | Cox et al. | |
| 2014/0279571 A1 | 9/2014 | Cox et al. | |
| 2014/0297238 A1 | 10/2014 | Parathasarathy et al. | |
| 2014/0312128 A1 | 10/2014 | Matsuoka et al. | |
| 2014/0337082 A1 | 11/2014 | Nofal | |
| 2014/0379298 A1 | 12/2014 | Gilbert | |
| 2015/0006129 A1 | 1/2015 | An et al. | |
| 2015/0006463 A1 | 1/2015 | Fadell et al. | |
| 2015/0127165 A1 | 5/2015 | Quam et al. | |
| 2015/0127167 A1 | 5/2015 | Quam et al. | |
| 2015/0127168 A1 | 5/2015 | Quam et al. | |
| 2015/0127169 A1 | 5/2015 | Quam et al. | |
| 2015/0127171 A1 | 5/2015 | Quam et al. | |
| 2015/0127172 A1 | 5/2015 | Quam et al. | |
| 2015/0127174 A1 | 5/2015 | Quam et al. | |
| 2015/0159899 A1 | 6/2015 | Bergman et al. | |
| 2015/0242874 A1 | 8/2015 | Voigt et al. | |

OTHER PUBLICATIONS

Honeywell "Quick Start Guide Wi-Fi Touchscreen Programmable Thermostat RTH8500WF Wi-Fi Series," pp. 1-2, 2012.*
Honeywell, Wi-Fi Thermostat 9000 color touchscreen User Guide, Honeywell International Inc., 2013, 69-2814EFS-01, pp. 1-60 Year: 2013).*
Honorof, Marshall, How to Set Up Google Chromecast, Feb. 5, 2014, Tom's Guide, URL=https://www.tomsguide.com/us/set-up-google-chromecast,news-18283.html (Year: 2014).*
Proliphix, Basic Series Network Thermostat Configuration Guide (NT10e and NT20e) Release 3.0, Jun. 2007, Part No. 600-01000-201 Rev 1, pp. i-xvi & 1-1 to 4-2. (Year: 2007).*
UX User Experience, "How should I toggle navigation for 2 distinct user types," publication dates in 2012, [retrieved on Sep. 30, 2019 from ux.stackexchange.com using the Internet <URL: https://ux.stackexchange.com/questions/22427/how-should-i-toggle-navigation-for-2-distinct-user-types> (Year: 2012).*
System Installation Guide THX9321 Prestige® 2.0 THX9421 Prestige® 2.0 with EIM, Honeywell, No. 69-2490-05 Rev. 02-12, pp. 1-28, 2012 (Year: 2012).*
Honeywell Home, Personalizing Your Lyric Smart Thermostat—Chapter 6, Youtube video, published Jun. 10, 2014, <url = https://www.youtube.com/watch?v=iZs8hQTUAK4 > [retrieved on Jan. 23, 2020] (Year: 2014).*
Aprilaire, "Model 8800 Communicating Thermostat System Installation Manual," 20 pages, 2011.
U.S. Appl. No. 15/045,120, filed Feb. 16, 2016.
U.S. Appl. No. 15/045,149, filed Feb. 16, 2016.
Emme Core, "User Guide," 100.0065 VER1.1, 47 pages, Jan. 2011.
Honeywell, "WebStat Controller—Intricate Control Made Simple," 4 pages, May 2007.
Honeywell, "WebStat Controller—Intricate Control Made Simple," 4 pages, Oct. 2010.
http://www.proliphix.com/products-remote-management.htm, "Univista Energy Manager (UEM) Software," 2 pages, printed Jul. 23, 2015.
Niagara "AX-3.$_x$ User Guide," Technical Document, 436 pages, May 1, 2007.
Proliphix, "Proliphix Remote Management Setup and User's Guide," Release 1.0, Part No. 600-08000-000, Rev. 1B, 36 pages, May 2008.
Proliphix, "UniVista User's Guide," Release 1.0, Part No. 600-09000-001, Rev. 2, 148 pages, Jun. 2008.
Tridium, "Niagara Appliance," 4 pages, downloaded Jul. 23, 2015.
"TRENDnet TEW-812DRU AC1750 Dual Band Wireless Router Review, " accessed from https://www.nikktech.com/main/articles/peripherals/network/modern-routers/2564-trendnet-ac1750-dual-band-wireless-router?tmpl=component&print Nov. 3, 2013, 29 pp.
Dickerson, "Unboxing—Honeywell Smart Thermostat Model #RTH9580WF," YouTube, accessed from https://www.youtube.com/water?v=nwbubYTMY_0, Jul. 16, 2013, 3 pp.
Honeywell, "Quick Start Guide," RTH9580 Wi-Fi, Honeywell International, Mar. 13, 2013, 20 pp.
Honeywell, "Wi-Fi Thermostat 9000 User Guide," 2013, 62 pp. (Applicant points out, in accordance with MPEP 609.04 (a), that the year of publication, 2013, is sufficiently earlier than the effective U.S. filing date, so that the particular month of publication is not in issue.)
Johnson, "Samsung Galaxy X4 Unboxing: Pictures of the latest Android powerhouse," accessed from https://www.trustedreviews.com/news/samsung-galaxy-s4-unboxing-plctures-of-the-latest-android-powerhouse-29073, Apr. 24, 2013, 12 pp.
First Office Action and Search Report, and translation thereof, from counterpart Chinese Application No. 201710086352.7, dated Jul. 24, 2019, 20 pp.
Honeywell International Inc., "Honeywell User Guide Wi-Fi Touchscreen Programmable Thermostat Model RTH8580WF," revised Jul. 12, 2012, pp. 1-72.
Manjoo, "The Thermostat Wars How Honeywell Could Beat Popular Upstart Nest," accessed from http://www.slate.com/articles/technology/technology/2012/02/honeywell_sues_nest_the_race_to_build_a_better_thermostat_.html , published Feb. 8, 2012, 3 pp.
"100 Years of Programmable Thermostats" accessed from Prothermostats.com accessed on or about retrieved on Jan. 23, 2018. Retrieved from the Internet http://www.prothermostats.com/history.php), 3 pp.

(56) References Cited

OTHER PUBLICATIONS

Nickinson, Phil "Samsung Galaxy S4 Specs" Android Central, accessed from https://www.androidcentral.com, published Mar. 14, 2013, 3 pp.

Honeywell "Installation Guide," TH8320ZW, Honeywell International Inc., Jun. 13, 2013, 16 pp.

Profis "How to turn your Galaxy S4 into a universal remote," accessed from https://www.cnet.com/how-to/how-to-turn-your-galaxy-s4-into-a-universal-remote/, May 17, 2013, 7 pp.

Aspalli et al., "Estimation of Induction Motor Field Efficiency for Energy Audit and Management Using Genetic Algorithm," 3rd International Conference on Sensing Technology, Nov. 30-Dec. 3, 2008, 6 pp.

Escriva-Escriva et al., "Application of an energy management and control system to assess the potential of different control strategies in HVAC systems," Energy and Buildings, Elsevier, Jul. 20, 2010, 10 pp.

"THX9321 Prestige 2.0 and THX9421 Prestige IAQ With EIM," Honeywell, 2013 (Applicant points out, in accordance with MPEP 609.04(a), that the year of publication, 2013, is sufficiently earlier than the effective U.S. filing date, so that the particular month of publication is not in issue.) 160 pp.

Amended Claims, and translation thereof, from counterpart Chinese Application No. 2017100863527, filed Feb. 6, 2020, 11 pp.

Second Office Action and Search Report, and translation thereof, from counterpart Chinese Application No. 201710086352.7, dated May 20, 2020, 15 pp.

Notification of Grant Patent Right for Invention from counterpart Chinese Application No. 201710086352.7, dated Sep. 8, 2020, 2 pp.

* cited by examiner

FIG. 17

MOBILE DEVICE WITH CONTRACTOR ACCESSIBLE SCREENS FOR CONFIGURING A BUILDING DEVICE

TECHNICAL FIELD

The present disclosure relates generally to systems, methods and tools for coordinating the activities of a contractor and a user/customer during the setup process of a building control system.

BACKGROUND

Most buildings include building control systems that monitor and regulate various functions of the building for the comfort and well-being of the users of the building. Building control systems can include, for example, Heating, ventilation, and/or air conditioning (HVAC) systems, security systems, lighting systems, fire control systems, and/or other building control systems.

In many cases, a contractor installs and initially configures a building control system. The building control system may include one or more building devices. Once installed and initially configured, a user of the building often personalizes the configuration settings of the building control system to tailor the configuration settings to their personal preferences. For example, in an HVAC system, a user might set temperature set points, set user schedules, enter names for one or more of the building devices, set WiFi connection settings, and the like. Coordination between the contractor and the user can be a challenge when both the contractor and the user are involved in different parts of the setup process of a building control system. What would be desirable are systems and methods that helps coordinate the activities of a contractor and a user during the setup process of a building control system. What would also be desirable is a system that provides contractors and users with different user experiences when configuring a building device, where the contractor is provided with additional features and functionality.

SUMMARY

The present disclosure relates generally to systems, methods and tools for coordinating the activities of a contractor and a user during a setup process of a building control system. In some instances, an application for a mobile device may provide contractors and users with different user experiences when configuring a building device, where the contractor is provided with additional features and functionality.

In one example, a non-transitory computer-readable storage medium with an executable program stored thereon may be provided, The program may instruct a mobile device to: display on a display of the mobile device a screen for accepting a contractor identifier from a user of the mobile device; receive a contactor identifier from the user; send the received contractor identifier to a remote computing device such as a server for verification; receive from the remote computing device an indication of whether the received contractor identifier is verified or not; and if the received contractor identifier is verified by the remote computing device, provide access to one or more contractor configuration screens on the display of the mobile device for configuring a building device installed in a building; and if the received contractor identifier is not verified by the remote computing device, not providing access to the one or more contractor configuration screens. In some cases, the program may be an application program that can be downloaded to the mobile devices of both the contractor and a user/customer. The contractor may enter a valid contractor identifier to gain access to additional contractor configuration screens that may not be available to a user/customer who does not have a valid contractor identifier.

In some cases, the contractor identifier may include a unique contractor number assigned to a particular contractor and associated with the particular contractor by the remote computing device. In some instances, the contractor identifier may include a contractor username and contractor password, and/or any other suitable contractor identifier as desired.

In some cases, the program may provide access to one or more user/customer screens on the display of the mobile device, different from the one or more contractor configuration screens, regardless of whether the contractor identifier is received or whether the received contractor identifier is verified by the remote computing device. That is, in some cases, the program may provide functionality that is useful to both the contractor and the user/customer without entering a valid contractor identifier. This may include changing set points, changes schedules, changing the system mode and/or other operational settings. In some cases, the same program may be downloaded and used on a contractor's mobile device and a user/customer's mobile device.

In some cases, if the received contractor identifier is verified by the remote computing device, the program may instruct the mobile device to: receive configuration information from the contractor via the one or more contractor configuration screens; establish communication between the mobile device and the installed building device; and communicate at least some of the received configuration information to the installed building device. In some cases, the program may instruct the mobile device to: receive configuration information from the user via the one or more contractor configuration screens; establish communication between the mobile device and the remote computing device; and communicate at least some of the received configuration information to the remote computing device. In some instances, the program may instruct the mobile device to: receive a building device identifier from the installed building device; and communicate the building device identifier to the remote computing device.

In some cases, the program may instruct the mobile device to: receive WiFi configuration information from the user via the one or more contractor configuration screens; establish communication between the mobile device and the installed building device; and communicate the WiFi configuration information to the installed building device to connect the installed building device to an existing WiFi network in the building. The program may also instruct the mobile device to: receive additional configuration information from the user via the one or more contractor configuration screens; establish communication between the mobile device and the remote computing device; and communicate at least some of the received configuration information to the remote computing device, so that the remote computing device can communicate the configuration information to the installed building device at least in part via the WiFi network. The program may also instruct the mobile device to: receive a building device identifier from the installed building device at the mobile device; and communicate the building device identifier to the remote computing device to associate the contractor identifier with the installed building device.

In another example, a mobile device may be provided for interacting with a building device that is installed in a building. The mobile device may include a user interface that includes a display, a memory for storing an executable program, and a controller operatively coupled to the user interface and the memory. In some cases, the controller may be configured to: provide a user of the mobile device with access to one or more customer screens on the display of the mobile device for interacting with the installed building device; display on the display of the mobile device a screen for accepting a contractor identifier from a user of the mobile device; receive a contactor identifier from the user via the screen for accepting the contractor identifier; send the received contractor identifier to a remote computing device for verification; receive from the remote computing device an indication of whether the received contractor identifier is verified or not. If the received contractor identifier is verified by the remote computing device, the mobile device may provide access to one or more contractor configuration screens, which are different from the one or more customer screens, on the display of the mobile device. If the received contractor identifier is not verified by the remote computing device, the mobile device may not provide access to the one or more contractor configuration screens. In some cases, one or more of the contractor configuration screens are in addition to the one or more customer screens.

In some instances, one or more of the contractor configuration screens allow the user to select a configuration profile from a plurality of configuration profiles. In some cases, one or more of the contractor configuration screens allow the user to save a configuration profile. In some cases, one or more of the contractor configuration screens allow the user to send an invite to a customer to complete the configuration of the installed building device.

An illustrative method for interacting with a building device that is installed in a building may include: providing access to one or more customer screens on a display of a mobile device for interacting with the installed building device; receiving a contactor identifier from a user of the mobile device; and providing access to one or more contractor configuration screens, which are different from the one or more customer screens, if the contractor identifier is a valid contractor identifier. In some cases, the method may include: receiving configuration information from the user via the one or more contractor configuration screens; establishing communication between the mobile device and the installed building device; and communicating at least some of the received configuration information to the installed building device. In some cases, the method may include: receiving configuration information from the user via the one or more contractor configuration screens; establishing communication between the mobile device and a remote computing device; and communicating at least some of the received configuration information to the remote computing device. In some instances, the method may include: receiving a building device identifier from the installed building device; and communicate the building device identifier to a remote computing device. In some cases, the method may include: receiving WiFi configuration information from the user via the one or more contractor configuration screens; establishing communication between the mobile device and the installed building device; and communicating the WiFi configuration information to the installed building device to connect the installed building device to an existing WiFi network in the building.

The above summary is not intended to describe each embodiment or every implementation of the present disclosure. Advantages and attainments, together with a more complete understanding of the disclosure, will become apparent and appreciated by referring to the following description and claims taken in conjunction with the accompanying drawings.

BRIEF DESCRIPTION OF THE FIGURES

The disclosure may be more completely understood in consideration of the following detailed description of various embodiments of the disclosure in connection with the accompanying drawings, in which:

FIGS. 17-22 are illustrative user screens of an application program downloaded to the user's mobile device for finishing the setup of a building control system;

Figure 1:
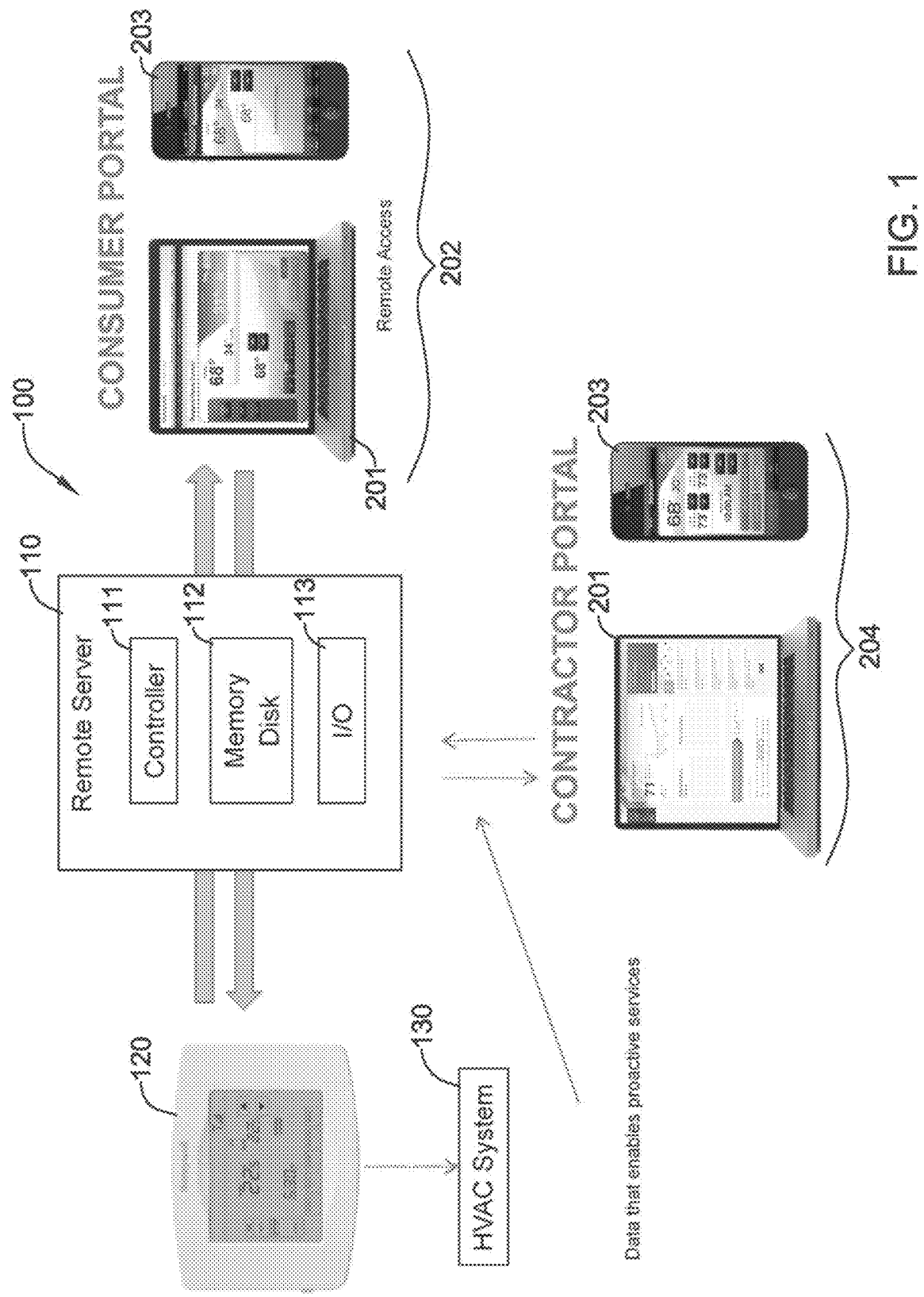
FIG. 1 is a schematic flow diagram of an illustrative system.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict selected embodiments and are not intended to limit the scope of the disclosure. Although examples of construction, dimensions, and materials are illustrated for the various elements, those skilled in the art will recognize that many of the examples provided have suitable alternatives that may be utilized.

Generally, the present disclosure relates to systems, methods and tools for coordinating the activities of a contractor and a user during a setup process of a building control system. Suitable building control systems include Heating, ventilation, and/or air conditioning (HVAC) systems, security systems, lighting systems, fire control systems, and/or any other suitable building control system. While an HVAC system is used as an example in this disclosure, it is contemplated that the present disclosure can be applied to any suitable building control system.

FIG. 1 shows a flow diagram of an illustrative system 100 for providing improved service to a number of building control systems. The illustrative system 100 may include a remote computing device 110 (e.g. one or more servers) communicating with one or more building control systems. In many cases, the remote computing device 110 will communicate and service many building control systems. In the example shown, one of the building control systems connected to the remote computing device 110 includes HVAC system 130. The HVAC system 130 is controlled by an HVAC controller 120. The HVAC controller 120 may be in communication with the remote computing device 110 via a network, sometimes via a wired or wireless internet gateway or modem, a cellular network, a telephony network, and/or any other suitable network as desired.

The system 100 may include a customer portal 202. The customer portal 202 may include a web page, an application program code (or app) downloaded to a customer's mobile device 203, a program, and/or other interface configured by, on, or through the controller 111 of the remote computing device 110. A customer of the system 100 may gain remote access to their particular building control system(s) via the customer portal 202. A customer may create a customer account on the remote computing device 110, and may register or otherwise associate their particular building control systems with their customer account.

The system 100 may also include a contractor portal 204. The contractor portal 204 may include a web page, an application program code (or app) downloaded to a contractor's mobile device 203, a program, and/or other interface configured by, on, or through the controller 111 of the remote computing device 110. A contractor of the system 100 may gain remote access to their customer's building control system(s) via the contractor portal 204. A contractor may create a contractor account on the remote computing device 110, and may register or otherwise associate their customers building control systems with their contractor account.

The remote computing device 110 may include a controller 111, a memory 112, and/or a communications port 113 (e.g., an input/output port and/or other ports), where the controller 111 is in communication with the memory 112 and the communications port 113. The memory 112 may be configured to store data related to the configuration and/or operation of one or more building control systems (e.g., a plurality of user/customer building control systems). The controller 111 of the remote computing device(s) 110 may be or may include a processor (e.g., a microprocessor) capable of operating software. In some instances, the controller 111 may be configured to output via the communications port 113 one or more alerts related to an operation of one or more building control systems (e.g., a plurality of user/customer building control systems) for viewing by a contractor via the contractor portal 204 and/or by the customer via customer portal 202, as further described below. The contractor and customer may also configure a customer's building control system via the contractor portal 204 or customer portal 202, respectively.

In some cases, the remote computing device 110 may include a personal computer having a central processing unit, a display monitor, and communication and connectivity means, such as a modem or internet connection. Alternatively, or in addition, the remote computing device 110 may be a server or server farm. Alternatively, or in addition, the remote computing device 110 may include a telephone, a smart phone, a tablet computer, a personal digital assistant (PDA), an ebook reader, etc. The remote computing device 110 may include any number of additional or other components such as data storage (e.g., volatile and/or non-volatile memory) and data routing components, as desired. In some cases, the remote computing device 110 may be or may include a web server that may provide web pages that allow a user to gain access to and/or control a customer's building control system via the Internet, WiFi, Bluetooth, cellular, and/or other network.

The remote computing device 110 may be configured to operatively communicate with one or more building control systems. In the example shown, remote computing device 110 may be configured to operatively communicate with HVAC controller 120 via the communications port 113 over a network. In some cases, the remote computing device 110 may be capable of transmitting one or more signals to HVAC controller 120 through the communications port 113. Additionally, or alternatively, the remote computing device 110 may be capable of receiving data from the HVAC controller 120 regarding the building control system (e.g. HVAC systems 130). In some cases, the HVAC controller 120 and/or the remote computing device 110 may be capable of analyzing (e.g., via trend analysis and/or other statistical analyses) the building control system (e.g. HVAC system 130) related data, and generate one or more output reports based on the received data, which may be requested, received, and/or analyzed by or at the customer portal 202 and/or the contractor portal 204.

The HVAC system 130 and HVAC controller 120 of FIG. 1 may be considered one of a number of building control systems that are in communication with the remote computing device 110. In one example, there may be 2, 10, 20, 30, 50, 100, 1000, 10,000 or other number of building control systems in communication with the remote computing device 110. In FIG. 1, it is contemplated that the HVAC system 130 may be a residential and/or a commercial HVAC system. In some cases, the remote computing device 110 may maintain a customer database on memory disk 112 that identifies the particular HVAC controller 120 and/or HVAC system 130 that corresponds to each customer. Each customer may have a customer account that is associated with the customers building control system(s). In some cases, the remote computing device 110 may be used to search the customer database according to one or more search criteria, such as a geographic region, type of HVAC system equipment, service level, active alerts, maintenance requirements, and/or in any other suitable manner. In some cases, the remote computing device 110 may maintain a contractor database of valid contractors. Each contractor may have a contractor account. The contractor database may associate customer's building control systems with certain contractors. In many cases, a customer must authorize an association between the customer's building control system and a contractor.

In some instances, customers (e.g., a user or operator of an HVAC system 130) and/or contractors may have computing devices (e.g., a personal computer 201, a mobile computing device 203, etc.) that may communicate with the remote computing device 110 and/or associated building control systems (e.g. HVAC controller 120). The customer computing devices and the contractor computing devices may include personal computers 201 having a central processing unit, a display monitor, and communication and connectivity means, such as a modem or internet connection. Alternatively or in addition, the customer computing devices and/or the contractor computing devices may be telephones, smart phones 203, tablet computers, personal digital assistants (PDAs), ebook readers, etc. The customer computing devices and/or the contractor computing devices may include any number of additional or other computing devices, as desired. The customer computing devices and/or the contractor computing devices may communicate with the remote computing device 110 and/or the HVAC controller 120 through any suitable communication channel including, but not limited to, wired communication such as fiber optics, cables, twisted pairs, and the like, and/or wireless communication such as WiFi, radio, BLUETOOTH®, ZIGBEE®, near field, cellular, satellite, and the like. In some cases, the communication between customer computing devices and/or the contractor computing devices and the remote computing device 110 and/or the Building Control System (e.g. HVAC controller 120) may be capable of bi-directional (e.g., two-way) communication.

In some cases, a customer and/or contractor computing device may establish communication with the building control system (e.g. with HVAC controller 120). In some cases, the building control system may function as an access point, so that the customer and/or contractor computing device can easily connect to the building control system. The connection may be via WiFi, Bluetooth, Zigbee, and/or any other suitable communication protocol. In some cases, the customer and/or contractor computing device may query the user for configuration information to configure a connection between the building control system and the remote computing device 110. For example, the customer and/or contractor computing device may query the user for the SSID and password of the local WiFi password. Once received, the customer and/or contractor computing device may send the SSID and password of the local WiFi password to the building control system (e.g. with HVAC controller 120). The building control system may then use this information to join the WiFi network established by a local WiFi router or modem in the building. The building control system (e.g. with HVAC controller 120) may then contact the remote computing device 110 and register itself, sometimes using its MAC address or other unique identifier. This may establish a communication path between the building control system (e.g. with HVAC controller 120) and the remote computing device 110.

In some cases, the customer and/or contractor computing device may receive information from the building control system (e.g. with HVAC controller 120), and this information may be transmitted to the remote computing device 110 to help establish communication between the building control system (e.g. with HVAC controller 120) and the remote computing device 110 and/or to help associate a user/customer account and/or contractor account on the remote computing device 110 to a particular building control system (e.g. with HVAC controller 120). In one example, the customer and/or contractor computing device may receive the MAC address or other unique identifier from the building control system (e.g. with HVAC controller 120), such as via the local WiFi network, Bluetooth, Zigbee and/or any other suitable communication channel. The customer and/or contractor computing device may also receive user/customer account and/or contractor account information from the user/customer and/or contractor, respectively. This information may be sent to the remote computing device 110, sometimes via the local WiFi network, cellular and/or any other suitable connection. The remote computing device may then associate the MAC address and/or other unique identifier with the corresponding user/customer account and/or contractor account.

Figure 2:
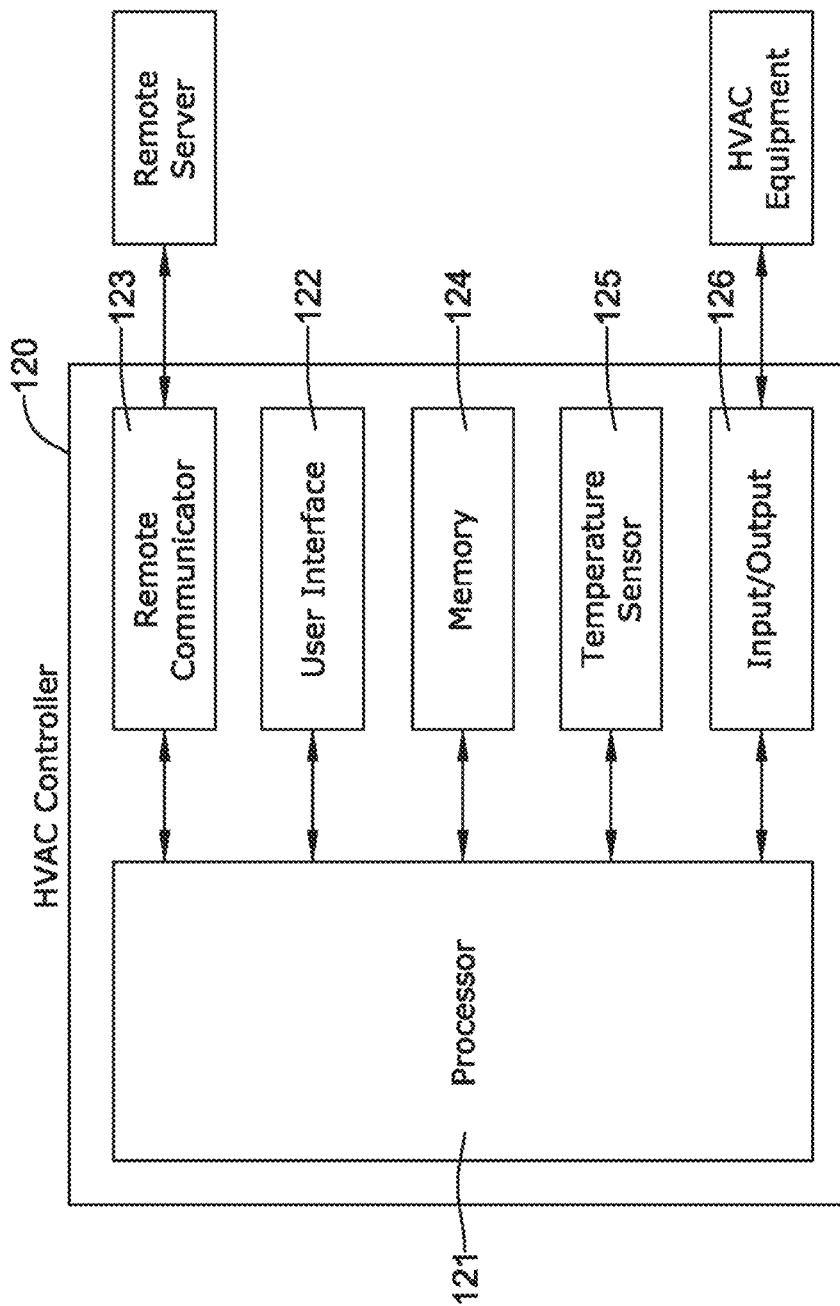
FIG. 2 is a schematic block diagram of an illustrative HVAC controller.

FIG. 2 is a block diagram of an illustrative HVAC controller 120, such as HVAC controller 120 of FIG. 1. The HVAC controller 120 may be any suitable HVAC controller, and in an illustrative instance, may include a processor 121 (e.g., a microprocessor or other processor), a user interface 122 (e.g., a display and/or keypad), a remote communicator 123 (e.g., a modem, gateway, etc.), a memory 124, a temperature sensor 125, and/or an input/output port 126. In some embodiments, the HVAC controller 120 may be coupled to the remote computing device 110 and/or the customer portal 202 and/or the contractor portal 204 via the remote communicator 123 and to the HVAC system(s) 130 (e.g., HVAC units or components thereof) via the input/output port 126. In some instances, the HVAC controller 120 and the HVAC system 130 may communicate over a common wired or wireless connection. In some cases, a common wire or bus may be configured to be compatible with the ENVIRACOM® protocol, provided by the assignee of the present disclosure, but this is not required. The ENVIRACOM® protocol may facilitate HVAC appliances, thermostats, gateways and other components communicating with each other over a common bus.

The processor 121 may be capable of being programmed such that the HVAC controller 120 changes one or more control signals sent to the HVAC system 130 based on the time of day, temperature, humidity, ventilation, or any other desired parameter. The user interface 122 may provide parameter readings and/or set point information to the user. The memory 124 may be embodied in a variety of forms, for example, read only memory may be used to retain operating and/or maintenance programs, predetermined operating values and/or configuration information, and random access memory may provide working memory space, as desired. The memory 124 may be volatile and/or non-volatile memory. The foregoing elements may be implemented by any suitable devices.

The temperature sensor 125 of the HVAC controller 120 may be located within or at the controller and/or the temperature sensor 125 may be located remote from the HVAC controller 120. The HVAC controller 120 may include or be in communication with a single temperature sensor 125 or more than one temperature sensor. Remotely located temperatures sensor(s) 125 may communicate with the HVAC controller 120 through the input/output port 126 or in any other manner.

In addition to the temperature sensor 125, the HVAC controller 120 may communicate with the one or more other sensors (e.g., humidity sensor, motion sensor, infra-red sensor, etc.). The one or more sensors other than the temperature sensor 125 may be located within or at the HVAC controller 120 and/or remote from the HVAC controller 120. Remotely located sensors other than the temperature sensors 125 may communicate with the HVAC controller 120 through the input/output port 126 or in any other manner.

In some cases, the HVAC controller 120 may be configured to track and/or store data and/or information related to the HVAC system 130 and/or operation of the HVAC system 130, where the controller may store the data and/or information in the memory 124 at the HVAC controller 120 and/or in memory 112 at one or more remote computing devices 110. The data and/or information related to the HVAC system 130 that the HVAC controller 120 may track and/or store can include performance data such as alerts, user interactions with the controller and/or the HVAC system (e.g., an interaction log), control settings, control settings of a controlled area relative to environment conditions exterior the controlled area, and/or any other suitable data and/or information. The HVAC controller 120 may track and/or store particular data and/or information on its own initiative in response to a previously programmed algorithm and/or upon a request from the remote computing device (e.g., via a customer using a customer portal 202 or a contractor using a contractor portal 204).

Based on the data and/or information tracked and/or stored by the HVAC controller 120, the HVAC controller 120 may generate one or more reports viewable from the customer portal 202 and/or the contractor portal 204. The HVAC controller 120 may generate the reports on its own initiative (e.g., as initially programmed or in response to recognizing a threshold value) or in response to receiving a command from the remote computing device 110, the customer portal 202, and/or the contractor portal 204. The generated reports may include data and/or information over a set time period, data and/or information compared to another set of data and/or information (e.g., controlled area settings versus outdoor temperatures, etc.), and/or any other analysis of the data or information.

The user interface 122 (e.g., a display and/or keypad) of the HVAC controller 120 may display one or more messages and/or queries. The messages and/or queries displayed on the user interface 122 of the HVAC controller 120 may be the same or different messages and/or queries than messages and/or queries that may be displayed at a customer portal 202 or the contractor portal 204. The messages and/or queries may include, but are not limited to, alerts related to the HVAC system 130, queries from a contractor entered at the contractor's portal 204, HVAC system setup or operating questions or messages, etc. In one example, customers may be able to access the customer portal 202 at the HVAC controller 120 and/or the contractors may be able to access the contractor portal 204 at the HVAC controller 120. Alternatively, or in addition, customers and/or contractors may be able to access respective portals 202, 204 using an application program code (e.g., mobile app or other app) or URL via the HVAC controller 120, a smart phone, a tablet, a laptop, a personal computer, and/or any computing device having or connected to a display.

Figure 3:
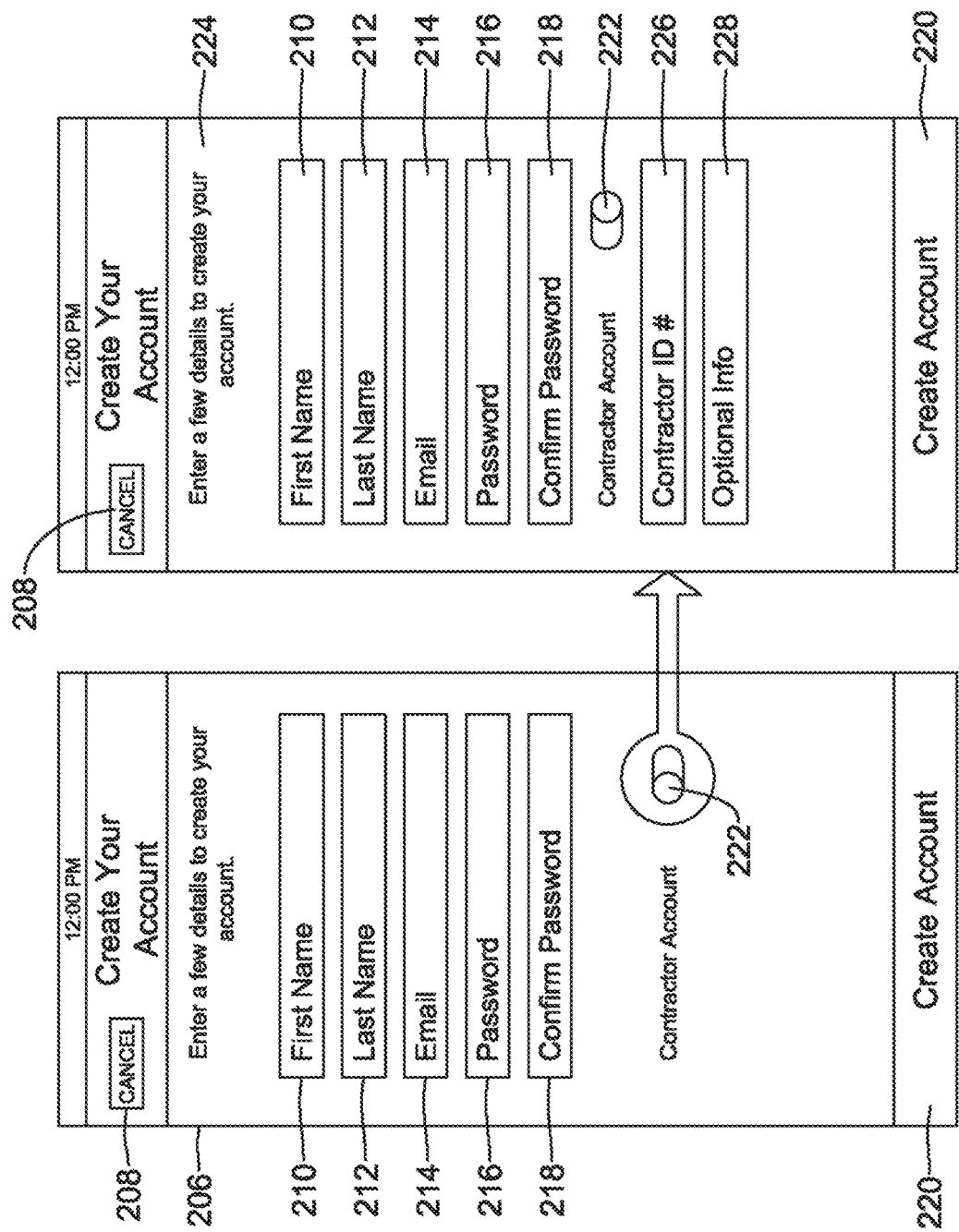
FIG. 3 is a schematic diagram showing an illustrative user interface of a contractor's mobile device when creating a contractor account for a building control system.

In some cases, customers and/or contractors may be able to access their respective portal 202, 204 by creating an account at a URL and associated webpage, or through an application program loaded on a mobile device (e.g., a mobile device having memory, a communications port, a display, and a controller in communication with the memory, the communications port, and the display), or other computing device. Screen 206 of FIG. 3 depicts a CREATE YOUR ACCOUNT page of a website or application program. The illustrative screen 206 may include one or more of a cancel button 208, a first name box 210, a last name box 212, an email box 214, a password box 216, a confirm password box 218, a create account button 220, and a contractor account toggle 222. It is contemplated that screen 206 may include one or more additional or alternative buttons, boxes, toggles, and/or other features. In addition to screen 206, FIG. 3 shows a screen 224. Screen 224 is a CREAT YOUR ACCOUNT page for a contractor that is accessed by selecting contractor account toggle 222 of screen 206. The illustrative screen 224 may include one or more of the cancel button 208, the first name box 210, the last name box 212, the email box 214, the password box 216, the confirm password box 218, the create account button 220, the contractor account toggle 222 (e.g., toggled on as shown by the left to right movement of toggle 222 from screen 206 to screen 224), a contractor identification (ID) number box 226, and an optional information 228. It is contemplated that screen 224 may include one or more additional or alternative buttons, boxes, toggles, and/or other features.

As an alternative to utilizing contractor account toggle 222, screen 206 may include a contractor ID number box 226 without selecting toggle 222 or other feature. In such cases, screen 206 may include a disclaimer adjacent contractor ID box 226 indicating a contractor ID is only required for contractor accounts and/or is not required for consumer accounts.

A customer/user may create an account that provides access to a customer portal 202 by entering information on the CREATE YOUR ACCOUNT screen 206. Customers that create an account may be able to do one or more of set up a personal profile, associate their building devices (e.g. HVAC Controller 120) with the account, view building devices (e.g., an HVAC controller 120 and/or other building device) associated with the customer, connect to building devices (e.g. HVAC Controller 120), manipulate settings of building devices (e.g. HVAC Controller 120), setup profiles, communicate with a designated contractor, and/or do other tasks/functions with respect to an associated building control system(s). Contractors that create an account on the CREATE YOUR ACCOUNT screen 224 may be able to do one or more of set up a personal profile, view jobs, view customers, view customer devices (e.g. HVAC Controller 120), configure customer devices (e.g. HVAC Controller 120), view data from customer devices (e.g. HVAC Controller 120), and/or do other tasks/functions with respect to associated building systems or building devices. In some cases, a contactor account may be specific to only the particular contractor, and/or in some cases, the contractor account may be tied to one or more contractors or a contractor company account.

In one example, a contractor may enter information in boxes 210, 212, 214, 216, 218 and select the contractor account toggle 222 of screen 206. The information provided to boxes 210, 212, 214, 216, 218 may be entered before and/or after selection of the contractor account toggle 222. After the contractor account toggle has been selected, a contractor may be presented with an option to identify as a valid contractor (e.g., by entering a valid contractor ID such as a previously assigned CPro ID or Sales Force ID) in box 226 or other identifying information) in screen 224. The contractor may also provide additional information (e.g. contractor company name) via box 228 of screen 206. Once all necessary and/or optional information has been entered, the information may be sent to remote computing device 110, which may verify that the contractor is a valid and registered contractor, and may create a contractor account that will then be associated with a particular customer's HVAC controller 120. If the contractor is verified by the remote computing device 110, the remote computing device 110 may send a verification to the contractor's mobile device.

In some cases, if the contractor is verified by the remote computing device 110, the mobile device may provide access to one or more contractor configuration screens for configuring a building device (e.g. HVAC controller 120) installed in a building, and if the contractor cannot be verified by the remote computing device 110, the mobile device may not provide access to the one or more contractor configuration screens. In some cases, the screens may be provided by an application program that has been downloaded to the mobile devices of both the contractor and a user/customer. As shown in FIG. 3, the contractor may then enter a valid contractor identifier 226 to gain access to additional contractor configuration screens that are not be available to a user/customer who does not have a valid contractor identifier. Some example additional contactor configuration screens may be similar to those shown in FIGS. 4-7.

After creating a contractor account and installing a customer-purchased building device (e.g. HVAC Controller 120), the contractor may set up or configure the building device by interacting directly with a user interface of the building device or through the contractor portal 204 on a mobile computing device or other computing device. In one example of setting up or configuring the building device (e.g. HVAC Controller 120) through the contractor portal 204, the contractor may connect the contractor portal 204 on a mobile computing device (e.g. app on smartphone, tablet, or other suitable device) to the installed building device (e.g. HVAC Controller 120) through a WiFi connection, through a BLUETOOTH® connection (e.g., low energy BLUETOOTH® connection) or through any other suitable type of wired or wireless connection. In some cases, the installed building device may function as an access point, so that the contractor's mobile computing device can easily connect to the installed building device. Once connected to the installed building device (e.g. HVAC Controller 120), the contractor may begin setting up/configuring the installed building device via the contractor portal 204 (e.g., manually selecting configuration settings and uploading those settings to the installed building device and/or by uploading a preconfigured configuration to the installed building device).

Figure 4:
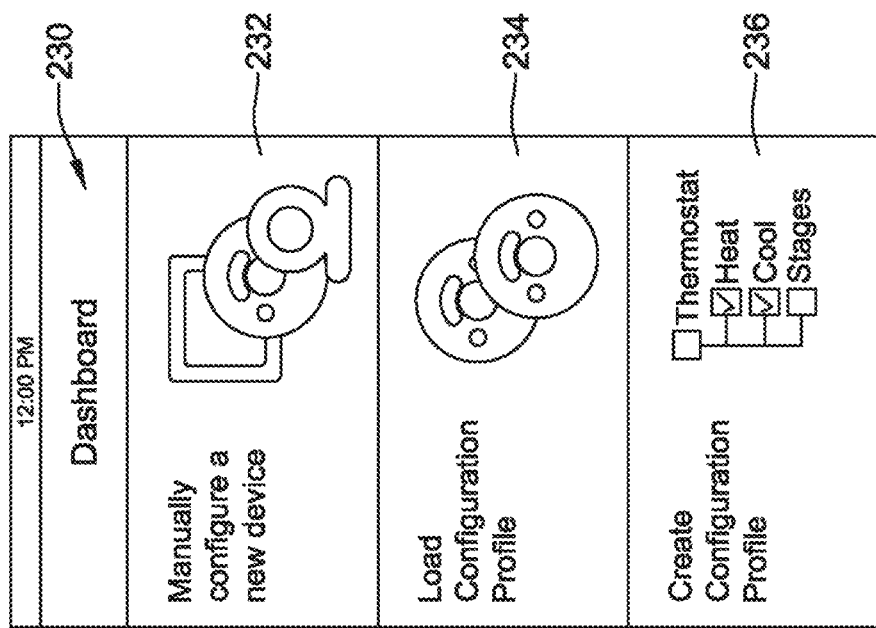
FIGS. 4-14 are illustrative contractor screens for display on a contractor's mobile device for initially configuring a building control system.
Figure 5:
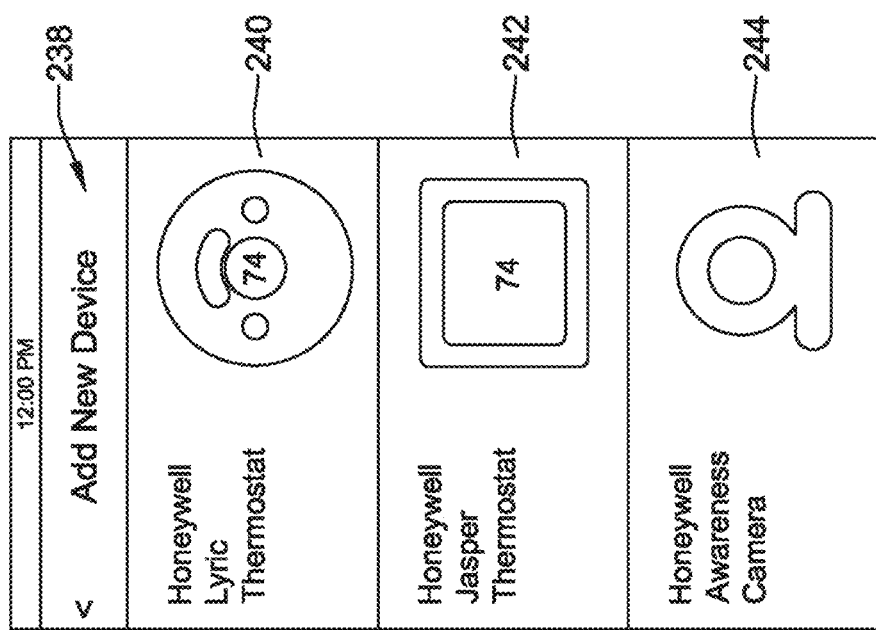

FIGS. 4-7 are illustrative contractor screens for display on a contractor's mobile or other device for initially configuring a building device (e.g. HVAC Controller 120). FIG. 4 depicts an initial dashboard screen 230 from which a contractor may begin setting up and configuring a building device. From the dashboard screen 230, a contractor may select from a "manually configure a new device" button 232, a "load configuration profile" button 234, a "create configuration profile" 236, and/or one or more other buttons (not shown). The "manually configure a new device" button 232 allows a contractor to manually configure a newly installed building device. The "load configuration profile" button 234 may allow a contractor to load an already developed device configuration onto the installed building device. The "create configuration profile" button 236 my allow a contractor to create and save various configuration profiles for common building device setups, and then later select and download an appropriate configuration profile to a building device using the "load configuration profile" button 234. This may save the contractor time when configuring building devices that have a common setup configuration.

In some cases, a non-transitory computer-readable storage medium (e.g. memory 112, memory 124, app store, or computer-readable storage medium) with an executable program (e.g. building device app) stored thereon may be provided, The program may instruct a mobile device to: display on a display of the mobile device a screen (e.g. screen 224) for accepting a contractor identifier (e.g. via box 226) from a user of the mobile device; receive a contactor identifier from the user; send the received contractor identifier to a remote computing device (e.g. remote computing device 110) such as a server for verification; receive from the remote computing device an indication of whether the received contractor identifier is verified or not; and if the received contractor identifier is verified by the remote computing device, provide access to one or more contractor configuration screens (e.g. contactor configuration screens may be similar to those shown in FIGS. 4-7) on the display of the mobile device for configuring a building device installed in a building; and if the received contractor identifier is not verified by the remote computing device, not providing access to the one or more contractor configuration screens. In some cases, the program may be an application program that can be downloaded to the mobile devices of both the contractor and a user/customer. The contractor may enter a valid contractor identifier to gain access to additional contractor configuration screens that may not be available to a user/customer who does not have a valid contractor identifier.

In some cases, the contractor identifier may include a unique contractor number assigned to a particular contractor and associated with the particular contractor by the remote computing device 110. In some instances, the contractor identifier may include a contractor username and contractor password, and/or any other suitable contractor identifier as desired.

In some cases, the program may provide access to one or more user/customer screens on the display of the mobile device (e.g. FIG. 22), different from the one or more contractor configuration screens, regardless of whether the contractor identifier is received or whether the received contractor identifier is verified by the remote computing device. That is, in some cases, the program may provide functionality that is useful to both the contractor and the user/customer without entering a valid contractor identifier. This may include changing set points, changes schedules, changing the system mode and/or other operational settings. In some cases, the same program may be downloaded and used on a contractor's mobile device and a user/customer's mobile device.

In some cases, if the received contractor identifier is verified by the remote computing device, the program may instruct the mobile device to: receive configuration information from the contractor via the one or more contractor configuration screens; establish communication between the mobile device and the installed building device; and communicate at least some of the received configuration information to the installed building device. In some cases, the program may instruct the mobile device to: receive configuration information from the user via the one or more contractor configuration screens; establish communication between the mobile device and the remote computing device; and communicate at least some of the received configuration information to the remote computing device. In some instances, the program may instruct the mobile device to: receive a building device identifier from the installed building device; and communicate the building device identifier to the remote computing device.

It is contemplated that various configuration profiles may be created and saved by a contractor, such as at a contractor's office or over time at previous jobs. Later, the contractor may access those previously saved profiles at a job site or other location for loading onto a newly installed building device by selecting the "load configuration profile" button 234 and then selecting a pre-configured profile from a list of saved profiles. If the contractor portal 204 is in communication with the installed building device, the selected profile may be loaded onto the connected installed building device, which may not require the contractor to manually enter each individual configuration setting.

An illustrative method for interacting with a building device that is installed in a building may include: providing access to one or more customer screens on a display of a mobile device for interacting with the installed building device; receiving a contactor identifier from a user of the mobile device; and providing access to one or more contractor configuration screens, which are different from the one or more customer screens, if the contractor identifier is a valid contractor identifier. In some cases, the method may include: receiving configuration information from the user via the one or more contractor configuration screens; establishing communication between the mobile device and the installed building device; and communicating at least some of the received configuration information to the installed building device. In some cases, the method may include: receiving configuration information from the user via the one or more contractor configuration screens; establishing communication between the mobile device and a remote computing device; and communicating at least some of the received configuration information to the remote computing device. In some instances, the method may include: receiving a building device identifier from the installed building device; and communicate the building device identifier to a remote computing device. In some cases, the method may include: receiving WiFi configuration information from the user via the one or more contractor configuration screens; establishing communication between the mobile device and the installed building device; and communicating the WiFi configuration information to the installed building device to connect the installed building device to an existing WiFi network in the building.

In some cases, a contractor may choose to setup or configure an installed building device manually. To start the process, the contractor may select the "manually configure a new device" button 232 from the dashboard 230. Selecting the "manually configure a new device" button 232 may bring a user to the "add new device" screen 238 shown in FIG. 5. The "add new device" screen 238 may list building devices capable of operating within the system 100. In one example, all building devices configured to be setup or configured through the contractor portal 204 may be listed. Alternatively, only those building devices that are actually detected by the system 100 are listed. The illustrative "add new device" screen 238 shown in FIG. 5 includes a first button 240 for selecting a first HVAC Controller Model (e.g. Honeywell Lyric™ Thermostat), a second button 242 for selecting a second HVAC Controller Model (e.g. Honeywell Jasper™ Thermostat), and a third button 244 for selecting a camera device (e.g. Honeywell Awareness™ Camera). It is contemplated that the "add new device" screen 238 may include more or less than three (3) buttons, and may list different devices other than those shown. If there are more available devices than the number of buttons on the "add new device" screen 238, the screen 238 may include a scroll function (not shown) to access other available devices not currently displayed on the screen 238. In the example shown, one of the device buttons 240, 242, 244 can be selected to advance to a configure screen 246 as shown in FIG. 6.

Figure 6:
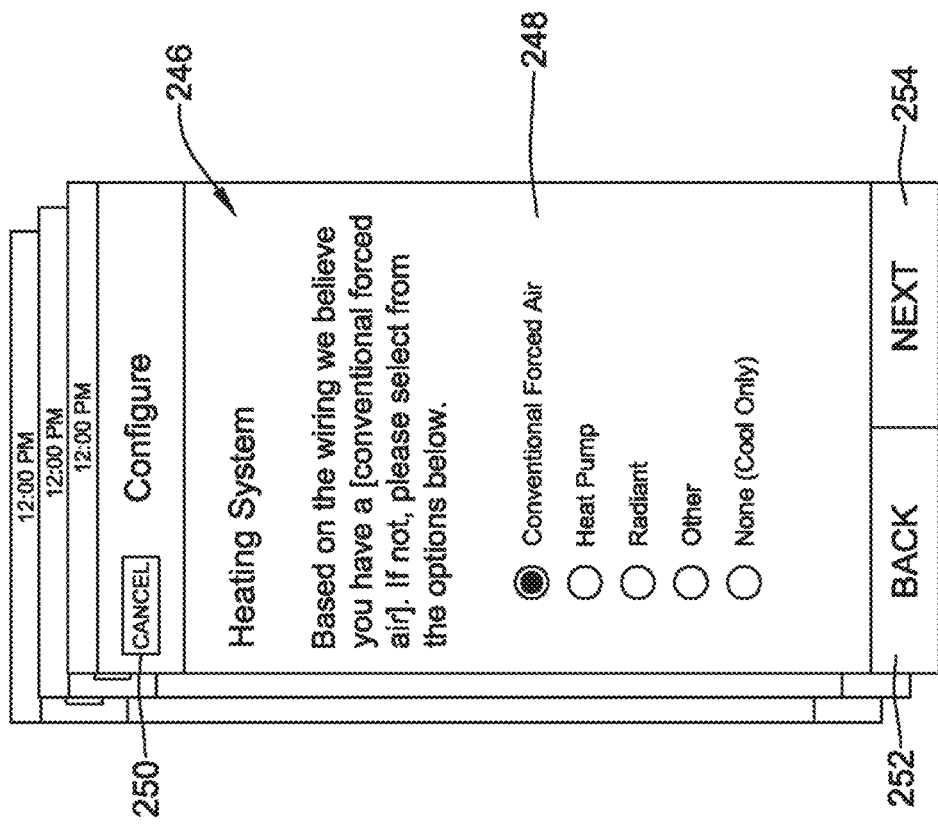

FIG. 6 shows one illustrative configure screen 246. However, it is contemplated that a plurality of configuration screens may be accessible by the contractor, sometimes sequentially by selecting the "NEXT" button 254 or "BACK" button 252. The configure screen(s) 246 may allow a contractor to setup or configure the building device selected via the "add new device" screen 238 shown in FIG. 5. An example device configuration process is described in U.S. patent application Ser. No. 14/565,306 filed on Dec. 9, 2014 and titled BUILDING CONTROL SYSTEM SETUP USING REMOTE CONTROL DEVICE, which is hereby incorporated by reference in its entirety for all purposes. The illustrative configure screen(s) 246 may be used by a contactor to partially or fully configure an installed building device (e.g. HVAC Controller 120).

In some cases, the building control system may report the systems and/or devices that are installed and connected in the building to the contractor's mobile device. When so provided, appropriate parts of the setup or configuration screen(s) 246 may be automatically populated based on the reported systems and/or devices. In one example, the HVAC Controller 120 and/or HVAC system 130 of FIG. 1 may report the type of HVAC system 130 that is installed (e.g. Conventional Forced Air, Heat Pump, Radiant, etc.) and/or the model of the HVAC controller 120, and the mobile device may automatically populate the configuration screens (e.g. configuration screen(s) 246) with such information. In other cases, the installer may manually enter appropriate configuration information via the configuration screen(s) 246.

In some cases, the configuration screen(s) 246 may have one or more selectable regions. For example, a first selectable region 248 may include a configuration region 248 that provides selectable options for selecting the type of HVAC system 130 that is to be controlled by the installed building controller (e.g. HVAC Controller 120). Other selectable regions of the configuration screen(s) 246 may include a cancel button 250 for canceling the configuration and returning to the "add new device" screen 238, a back button 252 for returning to a previous configuration screen, a next button 254 for advancing to a next configuration screen, and/or any other suitable selectable buttons as desired. Additionally, or alternatively, in some cases a user may move backward and forward through a sequence of configuration screens 246 by swiping or dragging a finger from side-to-side across the display of the contractor's mobile device.

Figure 7:
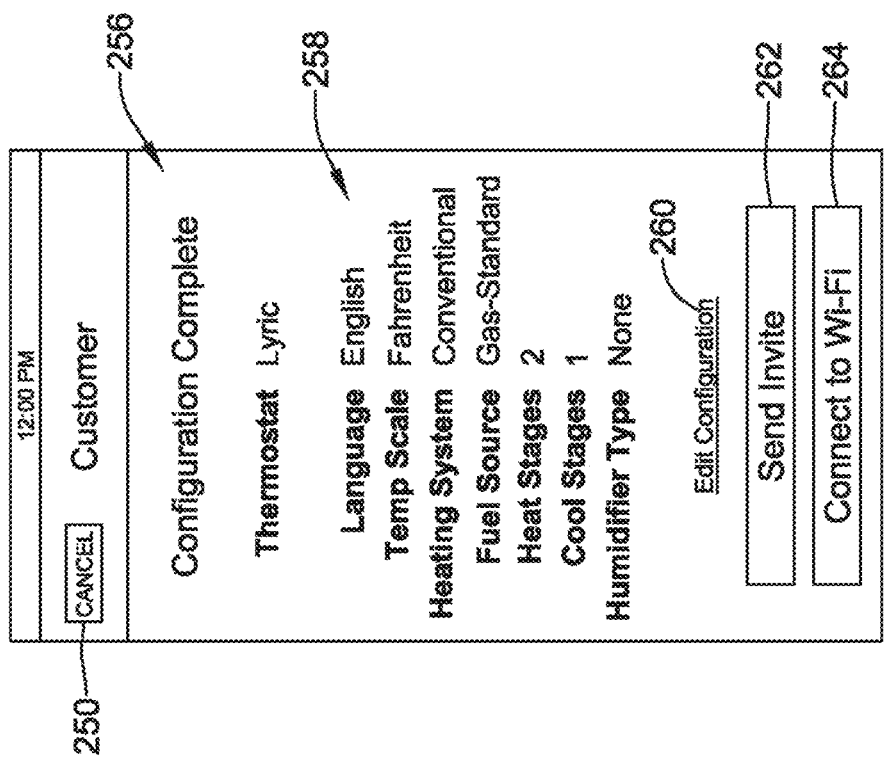

Once the contractor has at least partially configured the building control system, a configuration complete screen 256 may be displayed, such as shown in FIG. 7. The configuration complete screen 256 may summarize the selected configuration settings for the installed building device and/or system. In one example, the configuration complete screen 256 may include a summary region 258 that summarizes the configuration settings of the installed building device (e.g. HVAC Controller 120), an edit link or button 260 that allows for editing of the configuration, a send invite button 262 that allows a contractor to send an invite to a user/customer to download a mobile application and/or create a user/customer portal 202 account, a connect to WiFi button 264 for connecting to a user/customer's WiFi in the building, and/or one or more other buttons or selectable regions as desired.

If a contractor knows a user/customer's local WiFi password or the user/customer has authorized a contractor to connect the installed building device (e.g. HVAC Controller 120) to the customer's local WiFi network, the contractor may select the "connect to WiFi" button 264 on the configuration complete screen 256. This may allow the contractor to register the installed building device (e.g. HVAC Controller 120) with a local WiFi gateway, modem and/or router. FIGS. 8-13 illustrate WiFi connection screens for establishing a connection to the WiFi network, and once a WiFi connection has been established, registration screens for registering the installed building device with the remote computing device 110 may be provided.

Figure 8:
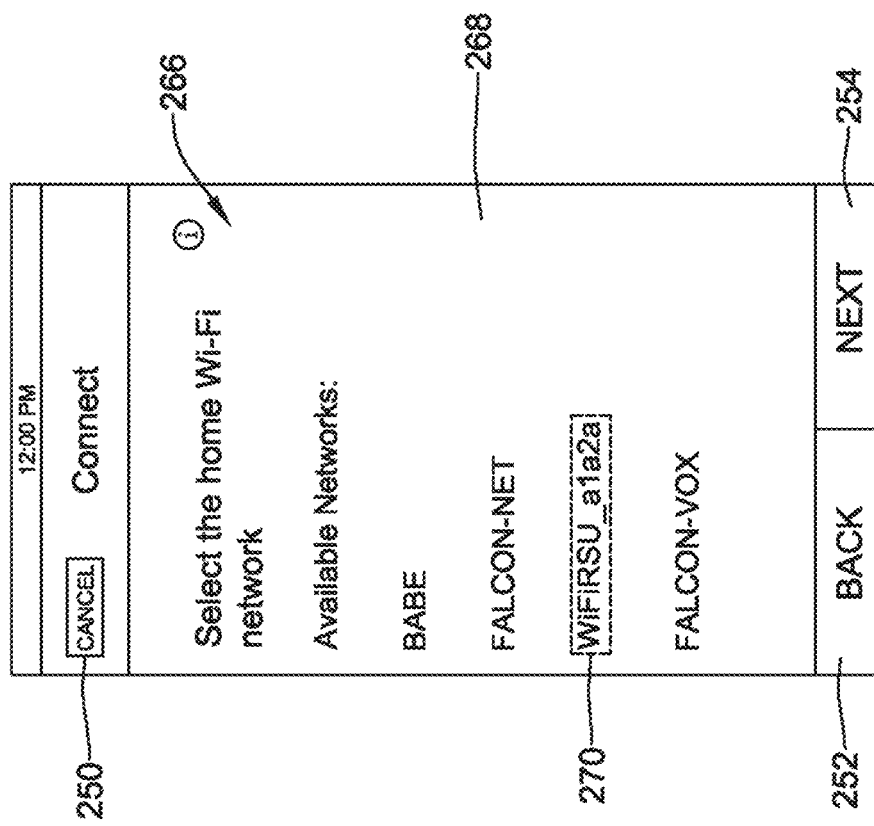
Figure 9:
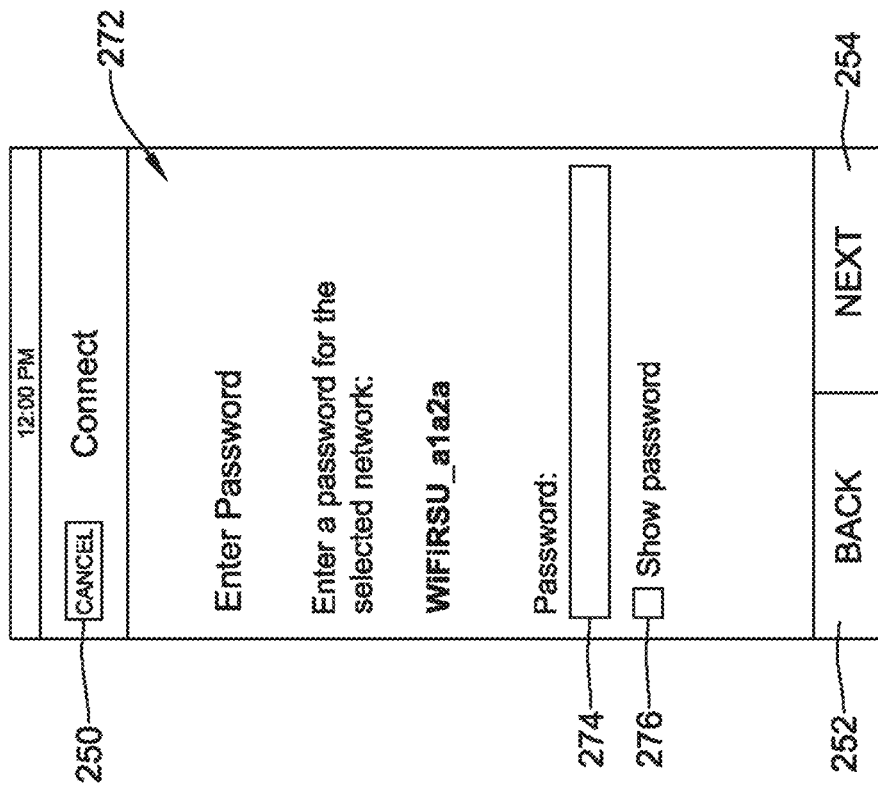

After selecting WiFi button 264 of screen 256, the contractor may be brought to a select WiFi screen 266 as shown in FIG. 8. As shown for example in FIG. 8, the select WiFi screen 266 may include one or more selectable features such as a cancel button 250, a back button 252, a next button 254, and an available networks region 268. The available networks region 268 of the select WiFi screen 266 may display available WiFi networks detected by the contractor's mobile device and/or the installed building device. If the customer's local WiFi network is listed in the available networks region 268 of the select WiFi screen 266, the contractor may select the customer's WiFi network as shown, for example, in FIG. 8 by dotted box 270. Selection of the customer's local WiFi network may bring the contractor to an enter password screen 272 such as shown in FIG. 9. Alternatively, a contractor may select the customer's WiFi network and then select the next button 254 to be brought to the enter password screen 272. Alternatively, once a WiFi network has been selected, a password box may be pop-up or be added to the select WiFi screen for entering the password of the selected WiFi network, if such a box is not previously present.

The WiFi password screen 272 may include a cancel button 250, a back button 252, a next button 254, a password box 274, and a show password box 276. The contractor may enter the customers WiFi password in the password box 274. If the contactor would like the actual typed password to be shown while it is entered, the contractor may select the show password box 276. Otherwise, the password will be represented by dots or obscured in some other manner as the password is entered via the user interface of the contractor's mobile device.

After entering the customer's WiFi password in the password box 274, the contractor may select the next button 254 to submit the entered password. In some cases, the WiFi network name and password may be sent to the building device (e.g. HVAC Controller 120), where the building device may use the WiFi network name (e.g. SSID) and password to join the local WiFi network.

Figure 10:
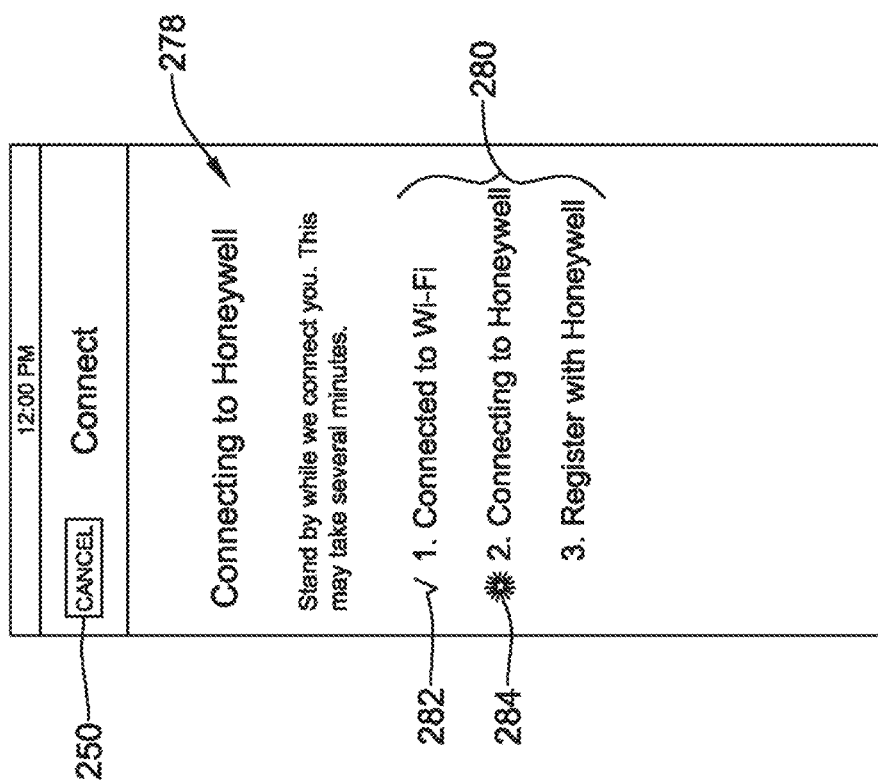

Once the password is entered into password box 274, and the contractor selects the NEXT button 254, screen 278 shown in FIG. 10 may be displayed. The "Connecting to Honeywell" screen 278 may include a list of steps 280 that indicate the progress of connecting to the local WiFi network and registering the building device with the remote computing device 110. In some cases, the remote computing device 110 may be a server of a manufacturer or service provider that supports the system 100. Each step of the list of steps 280 may include an indication (e.g., an icon to the side of the step, highlighting of the step, etc.) of whether the step is in progress, is completed, or has not yet begun. For example, as shown in FIG. 10, the "1. Connecting to WiFi" step is indicated as complete with a check mark icon, the "2. Connecting to Honeywell" step is indicated as in progress by a spin wheel 284, and "3. Register with Honeywell" does not have any icon indicated it has not yet started. At this point, the installed building device is connected to the local WiFi network, the contractor's mobile device and/or the installed building device is attempting to establish communication with the remote computing device 110, and the installed building device has not yet been registered with the remote computing device 110.

Figure 11:
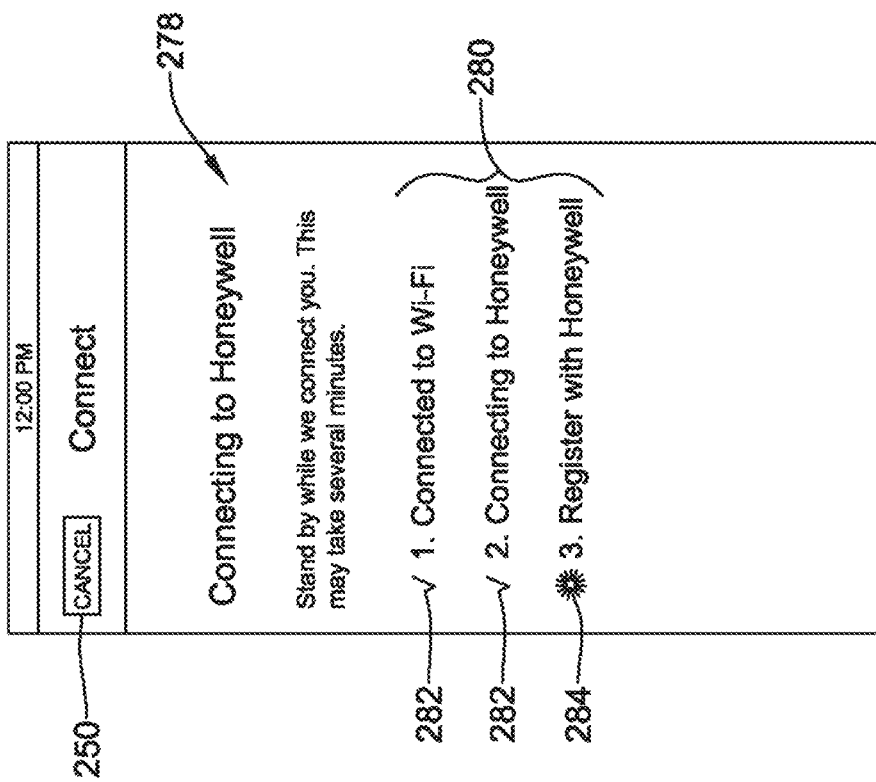
Figure 12:
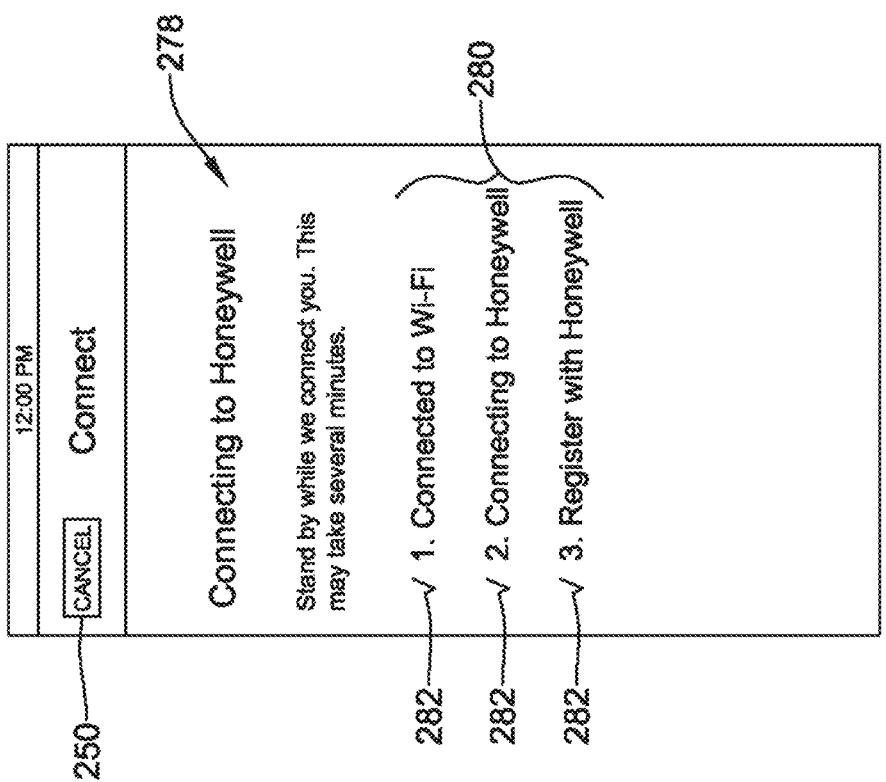

FIG. 11 shows steps "1. Connected to WiFi" and "2. Connected to Honeywell" as complete with a check mark icon 282, while the step "3. Registering with Honeywell" is indicated as in progress with a spin wheel 284. At this point, the installed building device is connected to the local WiFi network, the contractor's mobile device is in communication with the remote computing device 110 and passing the MAC address or other identifier of the installed building device to the remote computing device 110 to register the installed building device, but the installed building device has not yet been registered with the remote computing device 110. FIG. 12 shows all three steps "1. Connected to WiFi", "2. Connected to Honeywell", and "3. Registering with Honeywell" as complete with check mark icons 282. At this point, the installed building device is connected to the local WiFi network, the contractor's mobile device and/or the installed building device is in communication with the remote computing device 110 and has passing a MAC address or other identifier of the installed building device to the remote computing device 110, and the installed building device has been registered with the remote computing device 110.

In some cases, the contractor cannot connect the installed building device to a local WiFi network because the local WiFi network is not yet installed (e.g. new home construction) or the user/customer has not provided the contractor with the WiFi password. In such cases, the Media Access Control (MAC) address or other identifier of the installed building device may be communicated to the contractor's mobile device during the configuration process. In some cases, the contractor's mobile device may then connect to the remote computing device 110 (sometimes via the local WiFi network if present, otherwise via cellular and/or other communication), and may pass the MAC address or other identifier to the remote computing device 110 in order to register the installed building device (e.g. HVAC Controller 120) with the remote computing device 110. The remote computing device 110 may then use the MAC address or other identifier to establish communication between itself and the installed building device after the installed building device is connected to the local WiFi or other network. In some cases, one or more registration/configuration screens (e.g. FIGS. 18-21) may be provided to the user/customer to complete the registration/configuration of the installed building device.

Figure 13:
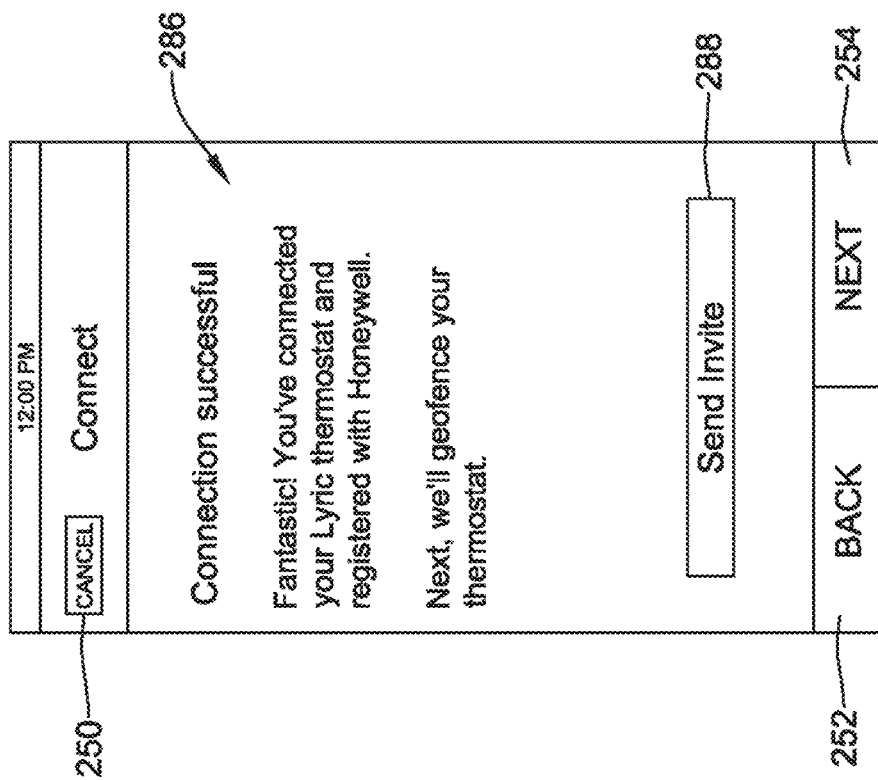

In some cases, such registration of the MAC address or other identifier may facilitate associating the contractor's account and/or a user account of a particular user/customer with the particular installed building device. As shown in FIG. 13, once registration is complete, the contractor portal 204 may display a "Connection Successful" screen 286 that indicates the installed building device (e.g. Lyric™ Thermostat) has been successfully connected to and registered with the remote computing device 110. Alternatively, if registration was not successful, the contractor portal 204 may display a screen (not shown) indicating registration was unsuccessful, and in some cases, a reason for the lack of success.

The "Connection Successful" screen 286 may include a cancel button 250, a back button 252, a next button 254, and a send invite button 288. In some cases, "Connection Successful" screen 286 may include an indication of a next step, such as "Next, we'll geofence your thermostat" or "Next, . . . " in order to further configure the installed building device.

In some situations, the contractor may only partially configure the installed building device. When so provided, the contractor may partially configuring the building controller to at least perform its core intended function, such as control one or more building devices. For example, if the building controller is an HVAC controller that controls one or more HVAC components, partially configuring the HVAC controller may include configuring the HVAC controller sufficiently to operate the one or more HVAC components to maintain a set point temperature in the building. In some cases, it may be some time before the user/customer completes the registration and/or configuration of the installed building device. The contractor may then send an invite via send invite button 288 to a customer that invites the customer to complete the registration and/or configuration of the installed building device.

Figure 14:
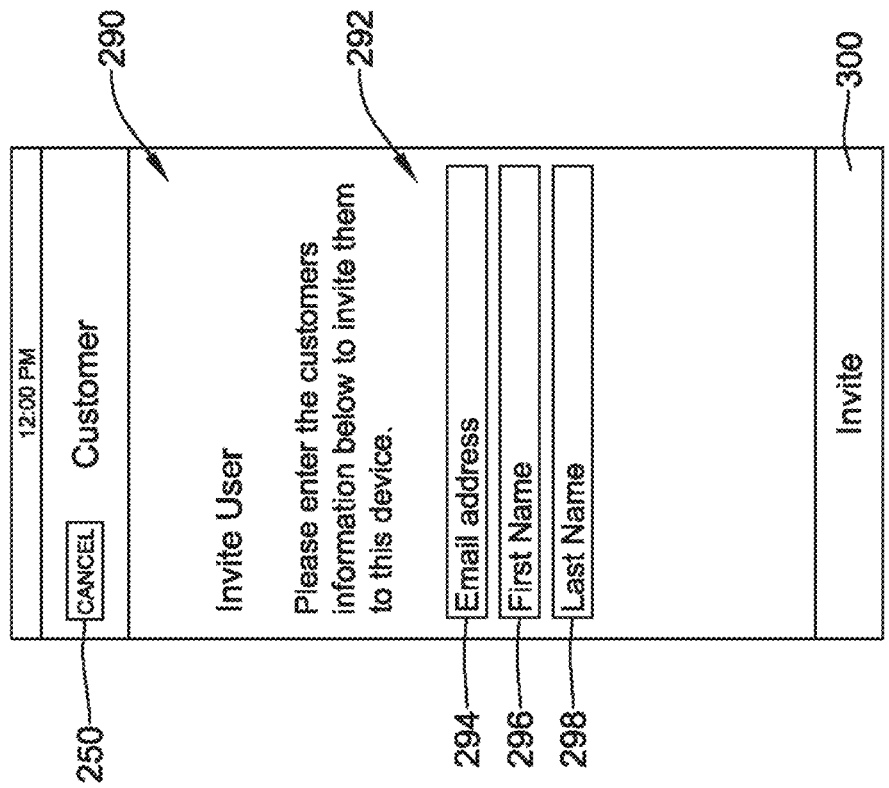

In some cases, if the send invite button 288 is selected, the contractor's mobile device may display an invite user screen 290, such as shown in FIG. 14. The invite user screen 290 may requesting contact information for the user/customer to allow the user/customer to be contacted and invited to create a user/customer account on the remote computing device 110.

In some cases, a contractor may arrive at the invite user screen 290 of FIG. 14 by selecting the send invite button 262 in the configuration complete screen 256 of FIG. 7. Selecting the send invite button 262 in the configuration complete screen 256 of FIG. 7 may be done in addition to or as an alternative to connecting the installed building device to WiFi. In one example, if a contractor does not know a customer's WiFi password, the contractor may be able to select the send invite button 262 of FIG. 7, arrive at the invite user screen 290 and send an invitation email to the customer and complete the contractor portion of the configuration of the installed building device. However, in this instance, when the user/customer eventually creates a user account, the system 100 may present suitable screens similar to those shown and described with reference to FIGS. 8-12 to connect the installed building device with the local WiFi network and register the installed building device with the remote computing device 110.

Returning to FIG. 14, the invite user screen 290 may include a cancel button 250, a customer information region 292, and an invite button 300. The customer information region 292 may include one or more boxes or spaces for entering user information. In the example invite user screen 290 shown in FIG. 14, there may be an email address box 294 for entering a customer email address, a first name box 296 for entering the customer's first name, and a last name box 298 for entering a customer's last name. In some cases, the customer information region 292 may include more than three boxes or less than three boxes and/or may request information in addition to or as an alternative to customer email address and customer name. In some cases, the user/customer's phone number may be entered so that the system may call and/or send a text message to the customer. In some cases, when a customer's information is known within the system 100, some or all of the customer information entered and received in the customer information region 292 may be partially or entirely automatically populated. Alternatively, the contractor may enter the customer information manually.

Once customer information is entered in the customer information region 292, the contractor may select the invite button 300 to send an email to the customer's email address 294 inviting the customer to create a user/customer account and in some cases download an application program code (or app) that will facilitate registering, configuring and/or controlling the installed building device. Although the Figures depict sending an invite to a customer via email, the invite may be sent to a customer via text message, a social network, a tag or other tangible item left at the location of the building device install, or through one or more other communications. In some cases, the system 100 may call the customer by phone, and play a recording that invites the customer to register and/or configure the installed building device.

Figure 15:
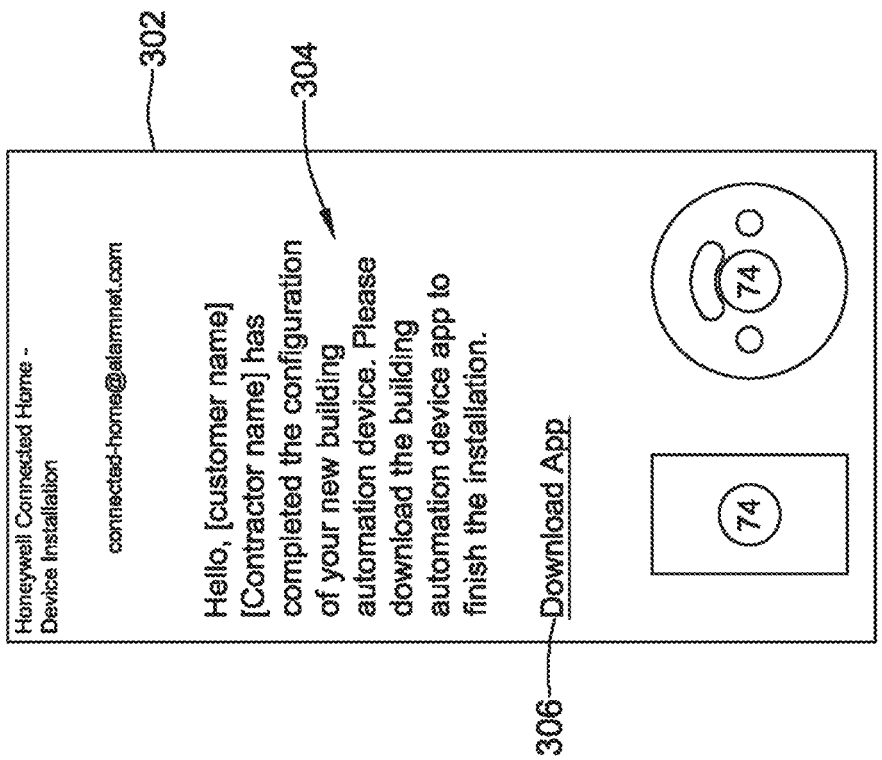
FIG. 15 is a an illustrative user invite screen for display on the user's mobile device that invites a user to download an application program to the user's mobile device to finish the setup process of the building control system.

FIG. 15 depicts an illustrative user/customer invite 302 received by a user/customer. The user/customer invite 302 may be included in an email message, a text message, and/or any other suitable form. The user/customer invite 302 may include an introduction region 304 and an action link 306. The introduction region 304 may indicate the installed building device has been installed by a particular contractor, and may invite the customer to connect to the remote computing device 110 and/or installed building device by, for example, downloading an application program code (or app) to finish the setup of the installed building device. In one example, the introduction region 304 may state "Hello, [Customer Name], [Contractor Name] has completed the configuration of your new building device. Please download the building device app to finish the installation".

Figure 16:
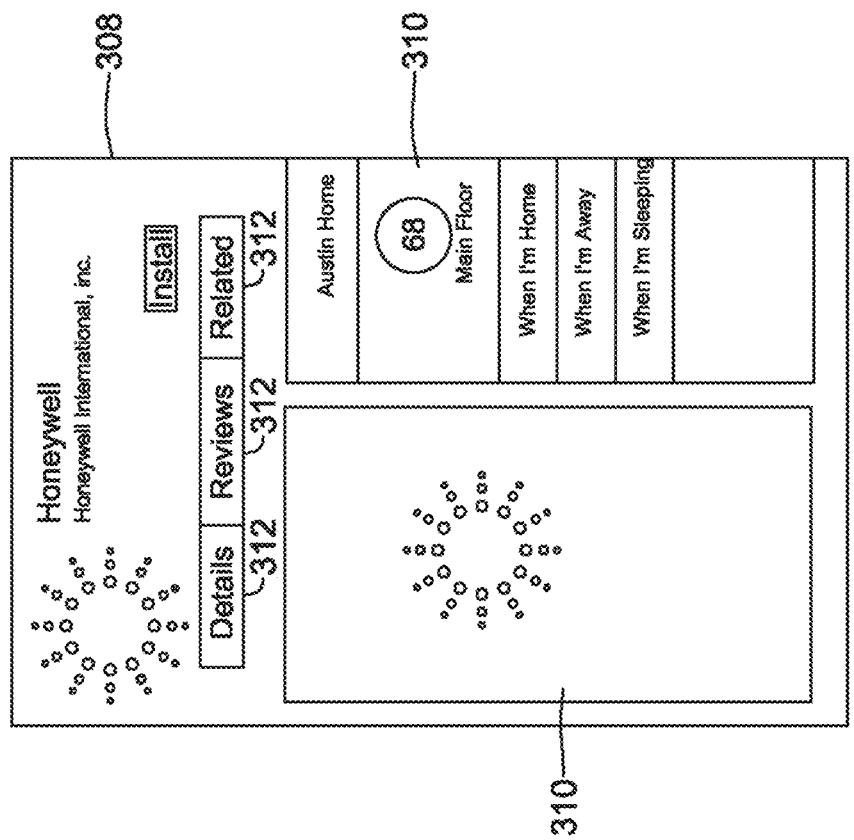
FIG. 16 is an illustrative application download screen of an application store that may be displayed after the "Download App" link in the user invite screen of FIG. 15 is selected.

The action link 306 may be a link to an appropriate building device app in an app store or on a web page. Selecting the action link may bring a user to a building device app screen 308 in an app store or the like, such as shown in FIG. 16. The building device app screen 308 may include sample app screens 310, selectable buttons 312 (e.g., a Details button, a Review button, and a Related app button), and an install link or button 314. In some cases, a user can scroll up and down or side to side to obtain additional information concerning or related to the building device app. By selecting the link or button 314, the building device app may be installed on the customer's computing device (e.g., mobile device, mobile phone, laptop, tablet, pc, ebook reader, gaming device, etc.).

Figure 17:
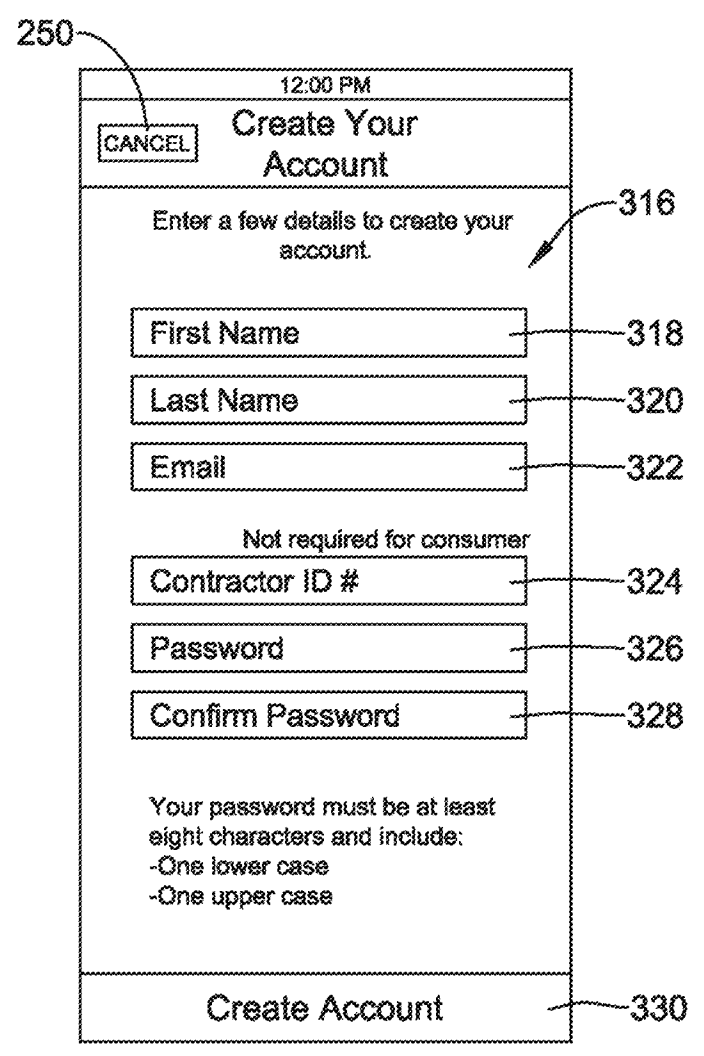

Once installed and launched, the building device app may display a "create your account" screen 316, as shown in FIG. 17. The "create your account" screen 316 may be similar to the "create your account" screens 206, 224 in FIG. 3. In the example shown in FIG. 17, the "create your account" screen 316 may include a cancel button 250, a create account button 220, and/or one or more customer information boxes. The customer information boxes may include a first name box 318, a last name box 320, an email address box 322, a contractor ID box 324 that may not be required for customer accounts, a password box 326, and a confirm password box 328. Once a customer has entered their information, a create account button 330 may be selected and the information may be communicated to the remote computing device 110. In response the remote computing device 110 may create the user/customer's account. In some cases, the email address of the user/customer may be used to link the user/customer account to the contractor account and to the installed building device. In other cases, the MAC address or other identifier of the installed building device may be used as the linking mechanism.

Figure 18:
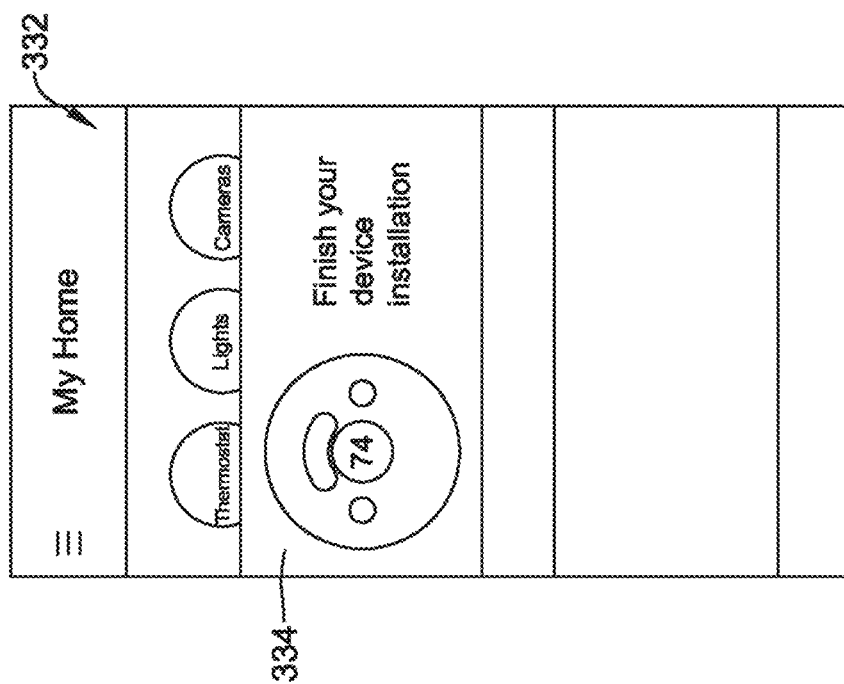

After a user/customer has created a user/customer account, the illustrative building device app displays on the user/customer's mobile device a finish installing screen 332 as appropriate, such as shown in FIG. 18. For example, if the contractor did not complete the configuration, the remote computing device 110 may flag the installed building device as having an unfinished configuration. In some cases, the user/customers email address, telephone number, MAC address, and/or other identifier (e.g. identifier used in the invite) may be used to identify the customer accounts, and more specifically the installed building devices associated with the customer accounts, which have an unfinished configuration. When flagged as having an unfinished configuration, the finish installing screen 332 may be displayed to the user/customer and in the example shown may include a "Finish Your Device Installation" button 334, which may be selected to arrive at one or more customer installation screens, two examples of which are shown at FIGS. 19 and 20.

Figure 19:
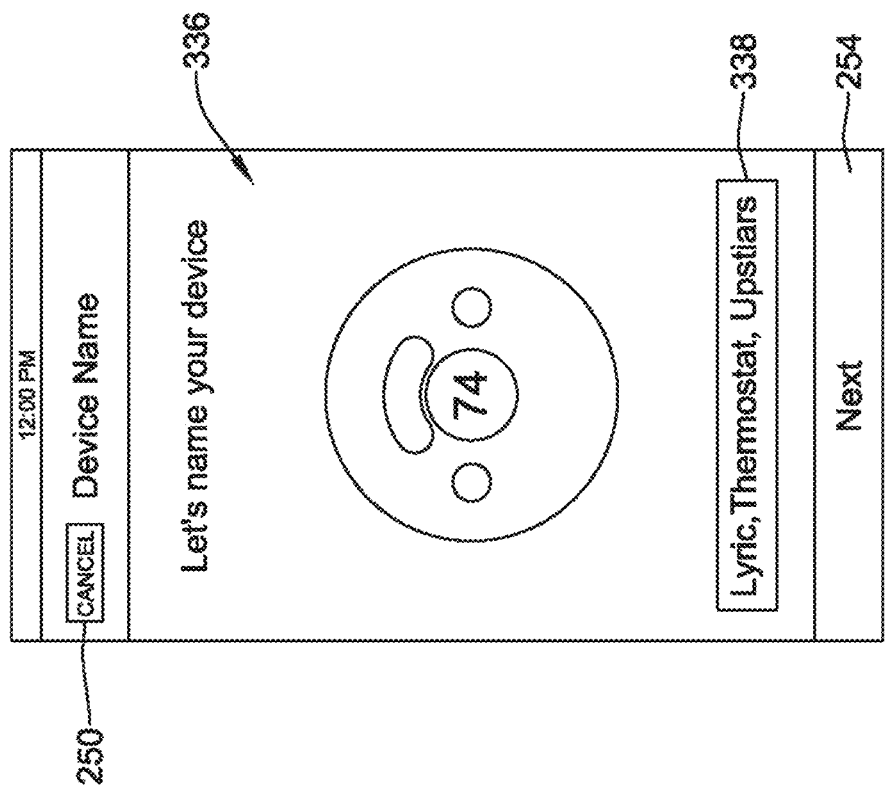
Figure 20:
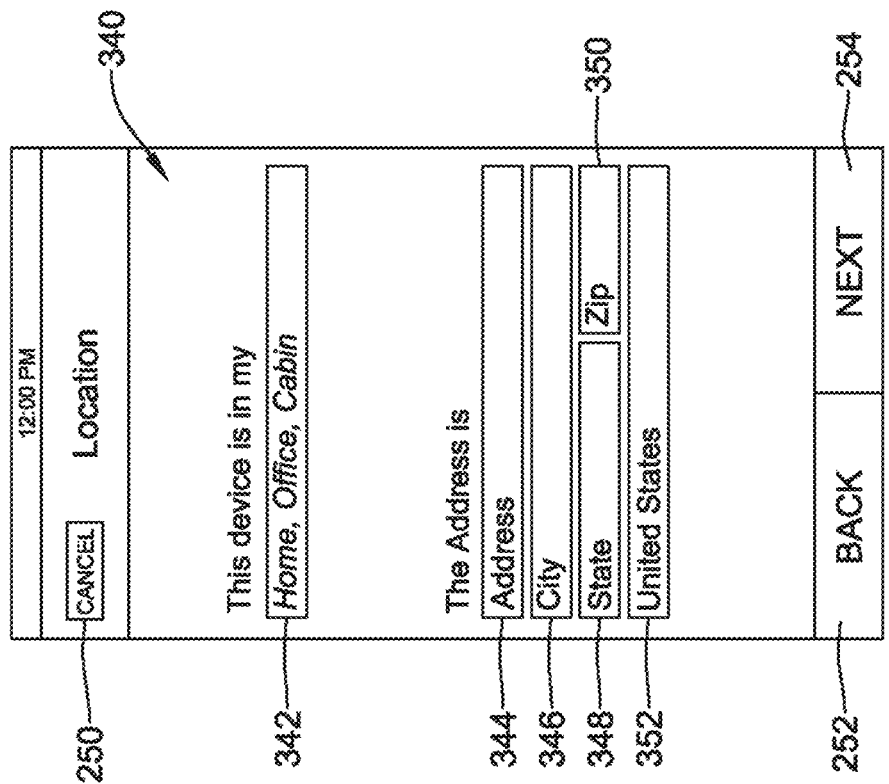

FIG. 19 shows an illustrative naming screen 336 from which a customer may assign a custom name to the installed building device. The customer may enter a name for the installed building device into the naming box 338. The name of the installed building device may be, for example, the device type, the device model, a location of the installed building device (e.g. main level, bedroom), or any other desired name for the installed building device. Once a name has been entered by the user, the user/customer may select the next button 254 to advance to location screen 340 shown in FIG. 20.

Figure 21:
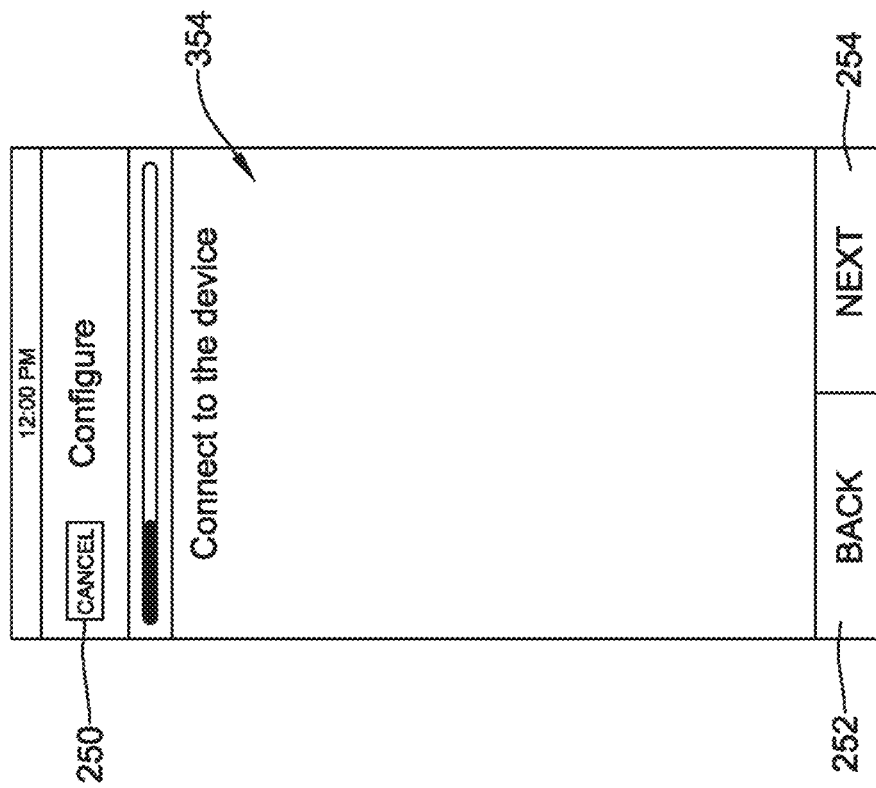

The location screen 340 includes a cancel button 250, a back button 252, a next button 254, and one or more boxes, maps, and/or toggles for entering a geographic location of the installed building device. In the example shown, the location screen 340 may include a descriptive location box 342 for naming the installed location (e.g. Home, Office, Cabin), a street address box 344, a city box 346, a state box 348, a zip code box 350, and a country box 352. Once location information is entered into the building device app, the customer may select the next button 254 to further configure the installed building device. FIG. 21 depicts a progress screen showing the progress of the configuration of the installed building device. Once complete, the user/customer may select the next button 254 to advance to, for example, a home screen 356 for the installed building device.

Figure 22:
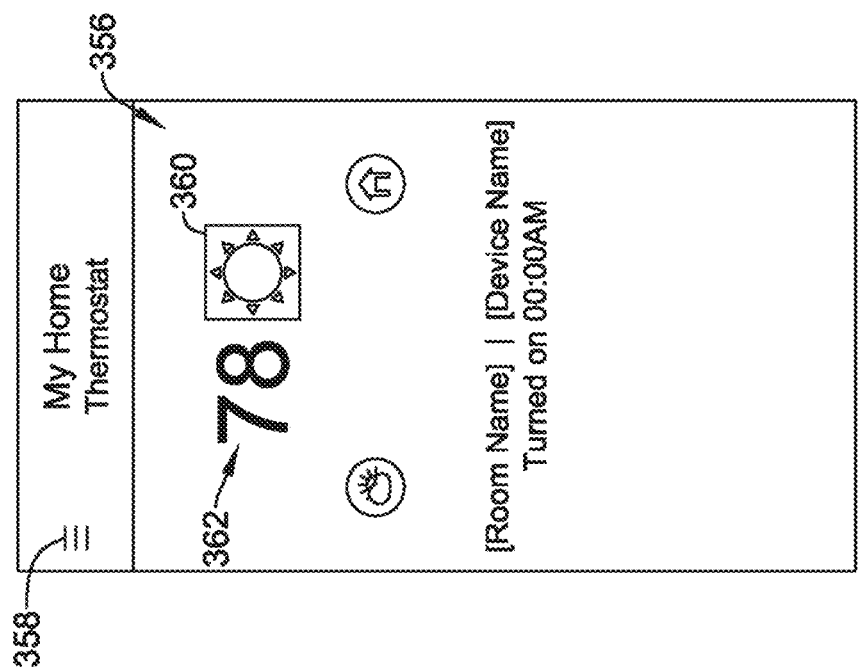

An illustrative home screen 356 is shown in FIG. 22, and may display information regarding the installed building device. The illustrative home screen 356 includes a menu button 358 selectable for access to a menu of features of the building device app. A current indoor sensed temperature 362, a system selection button 360, and/or other buttons may also be displayed. In some cases, the device name and/or location, entered via the screen 340 shown in FIG. 20, may be displayed on the home screen 356.

In some cases, a non-transitory computer-readable storage medium (e.g. memory 112, memory 124, app store, or computer-readable storage medium) with an executable program (e.g. building device app) stored thereon may be provided. The program may instruct a contractor's mobile device to: display one or more contractor configuration screens (e.g. FIGS. 4-7) on a display of the mobile device for configuring a building device installed in a building; receive configuration information from a contractor via the one or more contractor configuration screens, the received configuration information sufficient to only partially configure the installed building device; send the received configuration information, sometimes to the installed building device and/or a remote computing device 110; and send an invite (e.g. invite 302 of FIG. 15) to a customer inviting the customer to complete the configuration of the installed building device. The invite 302 may comprise an email, a text message, a message on a display of the installed building device and/or any other suitable message.

In some cases, the invite 302 may invite the customer to create a user account, login to the created user account and complete the configuration of the installed building device. In some instances, the invite may direct the customer to a web site (e.g. registration screen 396 of FIG. 29) on a remote computing device 110 that is or will be in communication with the installed building device. In some cases, the user may go to the web site and create the user account, login to the created user account and complete the configuration of the installed building device.

In some instances, the invite invites the customer to download an application program (building device app) to the customer's mobile device 203, wherein the downloaded application program may be used by the customer to create the user account, login to the created user account and complete the configuration of the installed building device. In some cases, the configuration information received by the user may be sent to the installed building device and/or a remote computing device 110. In some instances, the downloaded application program may communicate with the remote computing device 110 to identify what configuration information was already entered by the contractor when the contractor partially configured the installed building device, and may not query the customer for that same configuration information.

In another example, a non-transitory computer-readable storage medium (e.g. memory 112, memory 124, app store, or computer-readable storage medium) with an executable program (e.g. building device app) stored thereon may be provided. The program may instruct a user's mobile device to: receive an invite (e.g. invite 302 of FIG. 15) to complete a configuration of a building device, wherein the invite invites a user to install an application program on the mobile device; display the invite 302 on a display of the mobile device; accept one or more inputs from the user that causes the application program to be installed and executed on the mobile device, wherein the application program provides one or more configuration screens (e.g., see FIGS. 17-20) on the mobile device to receive additional configuration information to further configure the building device; and send the received additional configuration information, sometimes to the installed building device and/or a remote computing device 110.

In some instances, the application program may be configured to receive an indication if a building device associated with the invite is only partially configured; and if so, the application program may provide the one or more configuration screens (e.g. screens in FIGS. 17-21) on the mobile device to complete the configuration of the building device; and if not, the application program may not provide the one or more configuration screens on the mobile device to complete the configuration of the building device.

An illustrative method for configuring a building device that is installed in a building may include: receiving configuration information for the installed building device from a contractor, the received configuration information only partially configuring the installed building device; sending an invite to a customer, the invite including instructions on how to take action to complete the configuration of the installed building device; and the customer receiving the invite, and in response, the customer following the instructions to complete the configuration of the installed building device. In some cases, the configuration information received from the contractor is received via a mobile device of the contractor, and the customer completes the configuration of the installed building device via a mobile device of the customer.

Figure 23:
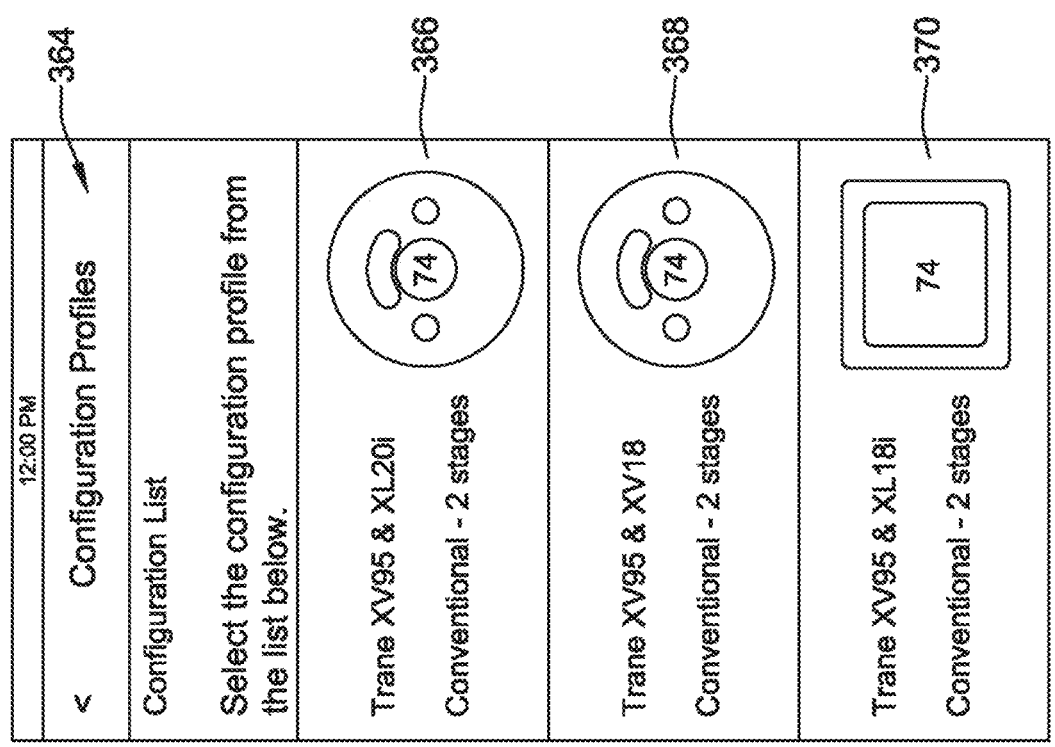
FIGS. 23-25 are illustrative contractor screens of an application program downloaded to the contractor's mobile device for configuring a building control system using one or more configuration profiles.

In some cases, a contractor may install a building device at a location by manually configuring the installed building device, as described above with respect to FIGS. 4-7. Alternatively, the contractor may load a pre-set configuration profile by selecting the load configuration profile button 234 in FIG. 4. After selecting the load configuration profile button 234, a configuration list screen 364 may be displayed, such as shown in FIG. 23. The configuration list screen 364 may display one or more building device configuration profiles. Although FIG. 23 shows a list of three configuration profiles, where each is associated with a corresponding button, 366, 368, 370, the configuration list screen 364 may display more or less selectable configuration profiles. In some cases, additional configuration profiles may be displayed by swiping up, down and/or side-to-side on the configuration list screen 364.

Figure 24:
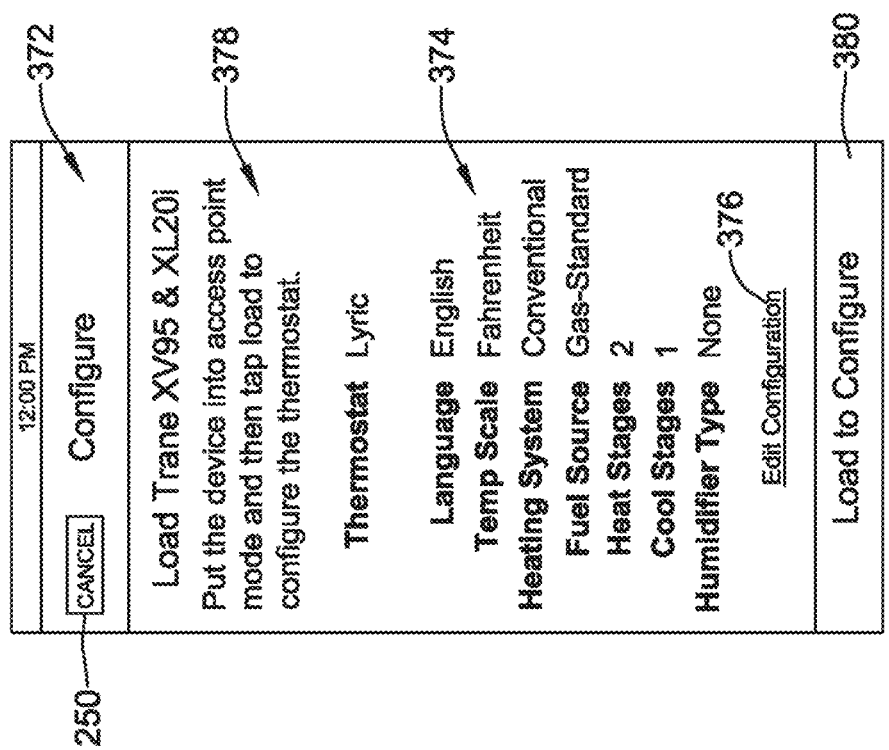

Once a contractor identifies a configuration profile from the list on the configuration list screen 364, the contractor may select the corresponding button 366, 368, or 370. In the example shown in FIGS. 23 and 24, the contractor may select button 366, and the building device app may display a configuration screen 372 showing a summary 374 of the selected configuration profile parameters, sometimes with the option to edit the selected configuration via an edit configuration link or button 376. In some cases, configuration profiles may be setup for various common building control system configurations. These may include different equipment combinations. For example, one configuration profile may correspond to a building control system that includes a 2 stage gas furnace, an air conditioner, and humidifier. Another configuration profile may be correspond to a building control system that includes a 2 stage heat pump and a ventilation system. Yet another configuration profile may correspond to a building control system that includes a 2 stage gas furnace, an air conditioner, a humidifier, a ventilation system, a security system and a lighting system.

In some cases, the configuration screen 372 may include an instruction portion 378, which may provide instructions for connecting the building device app to the installed building device. In one example, the instruction portion 378 may instruct: "Put the building device (e.g. HVAC controller 120) into access point mode and then tap load to configure the thermostat". In this example, after setting the installed building device into to a suitable wireless access mode so that the user/customer's mobile device can wirelessly connect to the installed building device, the contractor may selected the "load to configure" button 380 to load the selected configuration profile (sometimes edited) via the "edit configuration button, onto the installed building device.

Figure 25:
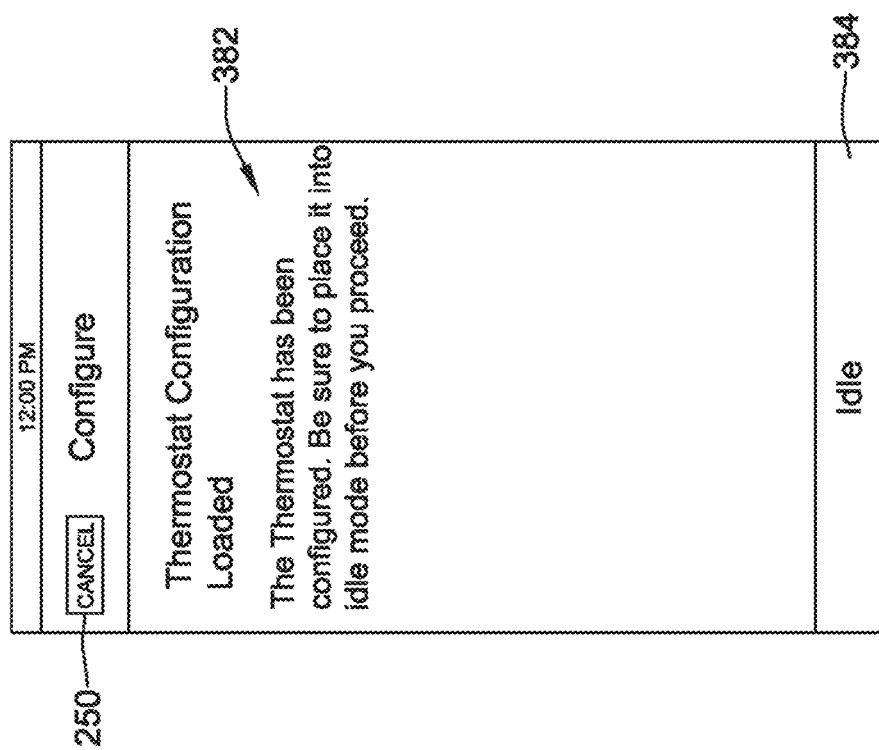

Once the selected configuration profile has been loaded onto the installed building device, a configuration loaded screen 382 may be displayed such as shown in FIG. 25. The configuration loaded screen 382 may provide confirmation that the selected configuration has been successfully loaded onto the installed building device. In one example, screen 382 may state "The building device (e.g. thermostat) has been configured. Be sure to place it into idle mode before you proceed". As the contractor may not know when the customer will be interacting with the installed building device, the contractor may place the installed building device in an idle mode by selecting an idle button 384. In the idle mode, the building device may not be fully configured (e.g. not connected to WiFi) but otherwise may be operational at least to perform its core intended function. For example, if the building device is a thermostat, the thermostat may be configured sufficiently to control the temperature in the building while in the idle mode.

Figure 26:
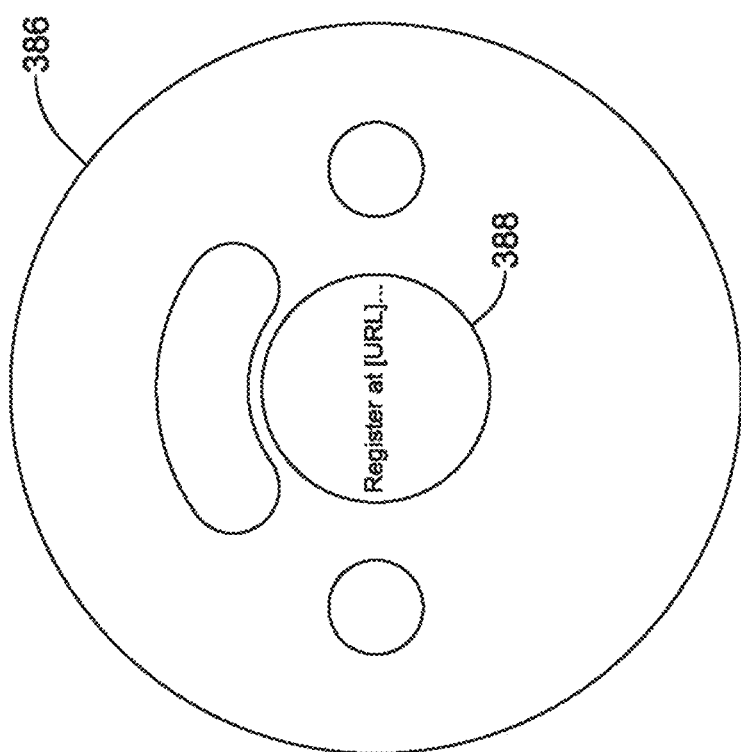
FIGS. 26-28 are illustrative schematic diagrams of a building device that is configured to instruct a user as to how to register and/or complete the configuration of the building control system.
Figure 27:
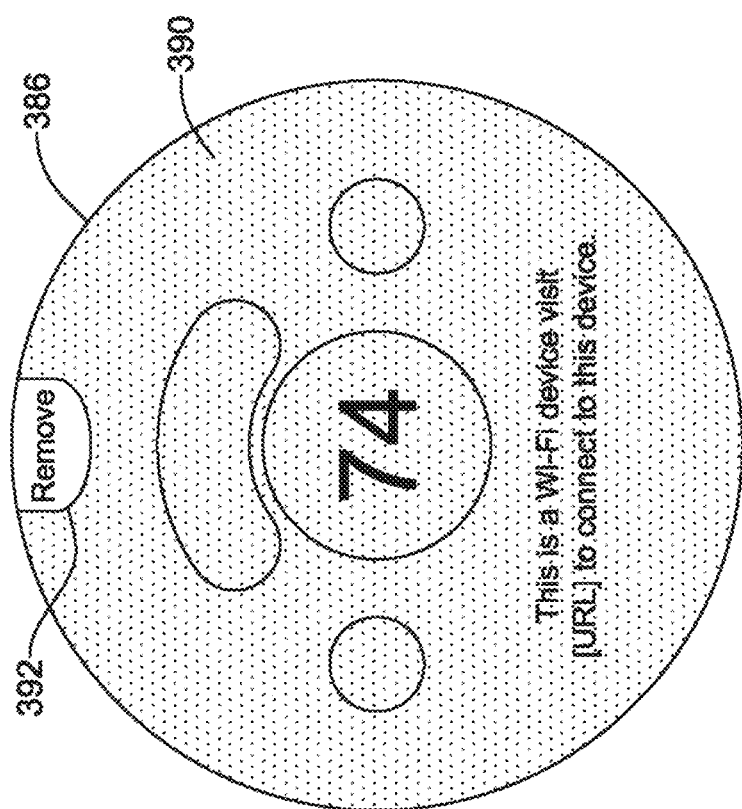
Figure 28:
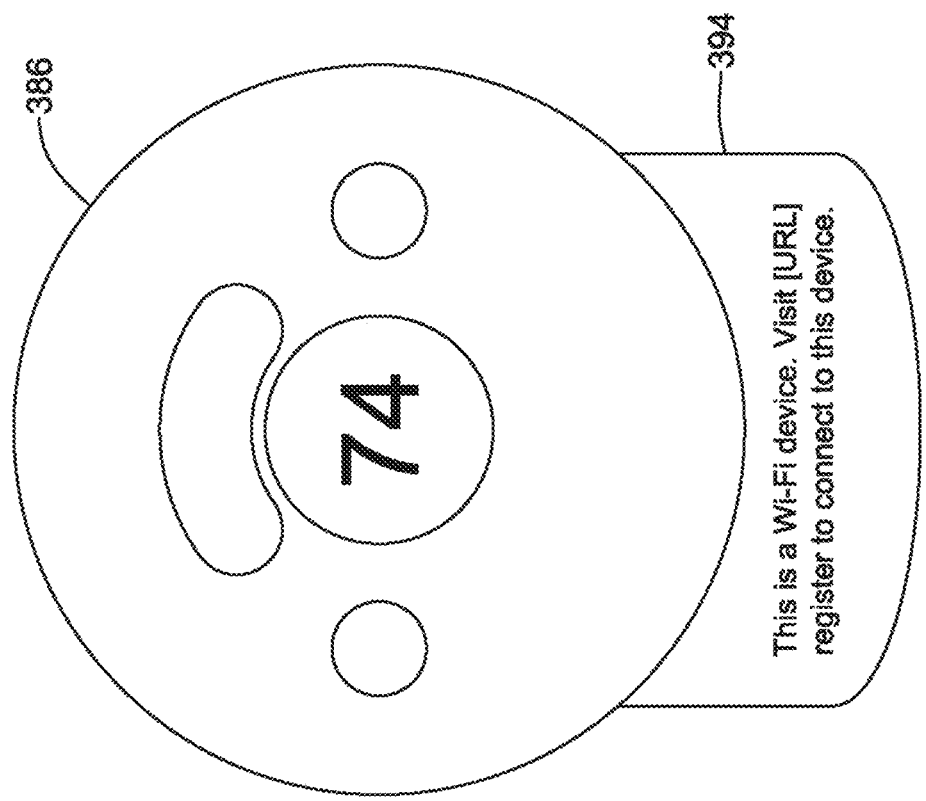

In some cases, when the contractor does not send an invite email or the like to a user/customer to finish the configuration and/or personalization of the building device, a message may be displayed at the installed building device instructing the user/customer how to finish the registration, configuration and/or personalization of the installed building device. FIGS. 26-28 show three example ways of displaying such a message. In FIG. 26, a message is scrolled or otherwise provided on a display 388 of the installed building device 386. In some cases, the message may provide a call to action (e.g., instructions to visit a website with further information for connecting the installed building device 386 to WiFi and/or otherwise finish the registration, configuration and/or personalization of the installed building device 386). In some cases, the message may include a media access control (MAC) address or other unique identifier of the installed building device 386, which may be entered into a web site or the like to help the remote computing device 110 to find and establish communication with the installed building device 386.

FIG. 27 depicts a cling 390 releasably attached to a face or other portion of an installed building device 386. The cling 390 may display similar information to that described above with respect to FIG. 26. In some cases, the cling 390 may display a message instructing the user/customer to visit a website to register the installed building device 386 and/or to provide further instruction on how to configure and/or personalize the installed building device 386. In the example shown in FIG. 27, the message may state "This is a WiFi enabled device. Visit [URL] to connect to this device". In some cases, the cling 390 may be removed from the face of the installed building device 386 by simply pulling on a tab 392.

FIG. 28 shows a hang tag 394 that may hang from the installed building device 386. It is contemplated that the hang tag 394 may display similar information to that described above with respect to FIGS. 26-27. The hang tag 394 may hang from any portion of the installed building device 386, and as shown in FIG. 28, the hang tag 394 may hang around a back portion of the installed building device 386. When the installed building device includes a wall plate and a head unit, where the wall plate is secured to the wall and the head unit is releasably coupled to the wall plate, the hang tag 394 may extend between the wall plate and the head unit, but this is not required.

More generally, in some instances, a contractor may install a building device and then partially configure the building device. The contractor may, for example, configure the building device sufficiently for the building device to at least perform its core intended function. The contractor may then leave a message at the building device for a customer. The message may including an instruction on how the customer can take action to further configure the building device. In some cases, the message may include an electronic message displayed on a display 388 of the building device (e.g., see FIG. 26). In some cases, the message may be on a cling that is releasably secured to a face of the building device (e.g., see FIG. 27) and/or may be on a hang tag that is releasably secured to the building device (e.g., see FIG. 28).

In some instances, the message may include an instruction on how the customer can register the building controller with a remote computing device 110 that is or will be in communication with the installed building device. For example, the message may include a URL to a registration web page for registering the building controller with the remote computing device. In some cases, the message may include a MAC address or other identifier that uniquely identifies the building device. In some cases, the message may include an instruction on how the customer can configure the building controller to connect with a local WiFi network.

In some cases, the building device is a building controller. When so provided, the contractor may partially configuring the building controller to at least perform its core intended function, such as control one or more building devices. For example, if the building controller comprises an HVAC controller that controls one or more HVAC components, partially configuring the HVAC controller may include configuring the HVAC controller sufficiently to operate the one or more HVAC components to maintain a set point temperature in the building. In this example, since it may be some time before the customer views the message at the building controller and takes action to further configure the building controller, the contractor may put the building controller into an operational state when the contractor leaves the message so that the building device controller control the one or more building devices during the intervening time period.

An example building controller may include a memory storing configuration parameters set by a contractor, a wireless interface, and a controller operably coupled to the memory and the wireless interface. In some cases, the controller may be configured to control one or more building devices based at least in part on the configuration parameters set by the contractor. The building controller may further include a message display object that is configured to display a message that includes an instruction on how a customer can take action to further configure the building controller. In some cases, the message display object may include an electronic display of the building controller that displays the message, a cling that is releasably secured to the building controller, a hang tag that is releasably attached to the building controller, and/or any other suitable message display object.

An example message display object configured for use with a building controller may include a substrate that displays a message that is visible to a user of the building controller. The message including an instruction on how the user can take action to further configure the building controller. The substrate may be configured to be releasably securable to the building controller. In some cases, the substrate may include a cling, a hang tag or any other suitable substrate.

Figure 29:
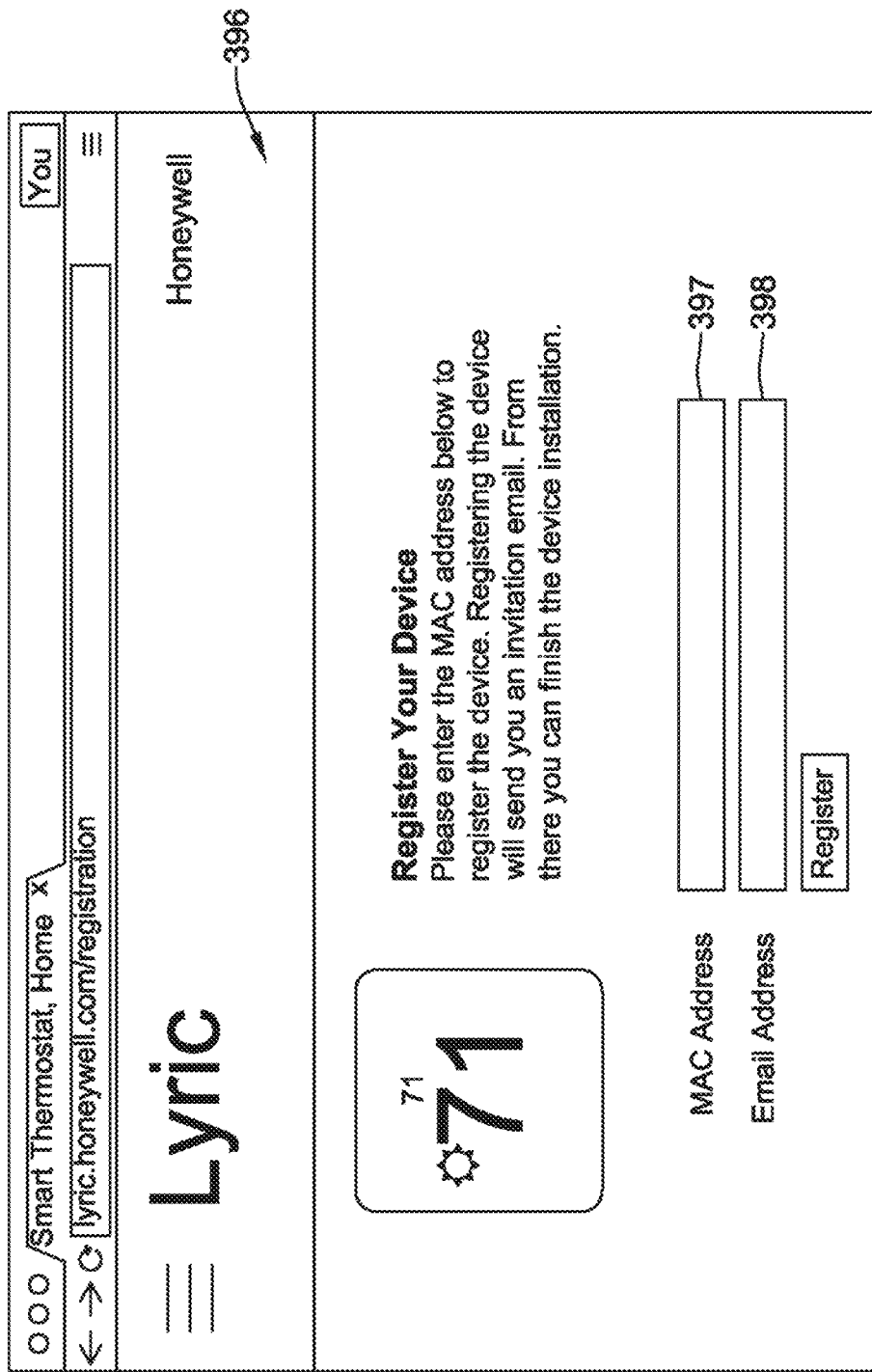
FIG. 29 is an illustrative screen for registering a building device.

FIG. 29 depicts an example registration screen 396 of a website that may be listed on the display 388 in FIG. 26, on the cling 390 in FIG. 27, and/or on the hang tag 394 in FIG. 28. The website may be hosted by, for example, remote computing device 110. The illustrative website allows a user to register the installed building device with the system 100 by entering a MAC address for the installed building device in a MAC address box 397 (or other unique identifier) and/or contact information (e.g., email address or other contact information) in a contact information box 398. In response to registering the installed building device, the user/customer may receive an invite to create an account on the customer portal 202 and/or associate the installed building device with the created user/customer account. In some cases, the user/customer may finish the configuration and/or personalization of the building device via the customer portal 202.

The disclosure should not be considered limited to the particular examples described above, but rather should be understood to cover all aspects of the disclosure as set out in the attached claims. Various modifications, equivalent processes, as well as numerous structures to which the disclosure can be applicable will be readily apparent to those of skill in the art upon review of the instant specification.

What is claimed is:

1. A non-transitory computer-readable storage medium with an executable program stored thereon, wherein the program instructs a mobile device to:
   receive, from a first user of the mobile device, configuration information comprising a plurality of configuration settings for configuring a first building device to control a first Heating, ventilation, and/or air conditioning (HVAC) system, wherein the plurality of configuration settings includes an identification of a type for the first HVAC system;
   save, at a remote server and in response to an input from the first user at the mobile device, the plurality of configuration settings for configuring the first building device to control the first HVAC system as a first configuration profile;
   receive, from the first user of the mobile device, an indication that the first user is a contractor;
   in response to receiving the indication, display on a display of the mobile device a screen for accepting a contractor identifier from the first user of the mobile device;
   receive the contactor identifier from the first user;
   send, via an internet connection, the received contractor identifier to the remote server device for verification;
   receive from the remote server device, via the internet connection, an indication of whether the received contractor identifier is verified or not;
   in response to the received contractor identifier being verified by the remote server device, provide access to one or more contractor configuration screens on the display of the mobile device for configuring a second building device to control a second HVAC system and provide access to one or more customer screens for operating the second building device, wherein the one or more contractor configuration screens comprise screens not available to a user without a verified contractor identifier, wherein the one or more contractor configuration screens comprise a screen for selecting a previously saved configuration profile from a list of one or more previously saved configuration profiles, wherein the list of one or more previously saved configuration profiles includes the first configuration profile;
   in response to the first user selecting the first configuration profile, loading the plurality of configuration settings for configuring the first building device to the second building device to configure the second building device to control the second HVAC system; and
   in response to not receiving an indication from a second user that the second user is a contractor, provide access to the one or more customer screens on the display of the mobile device for operating the second building device to the second user, but not access to the one or more contractor configuration screens to the second user.

2. The non-transitory computer-readable storage medium of claim 1, wherein the contactor identifier comprises a contractor username and contractor password.

3. The non-transitory computer-readable storage medium of claim 1, wherein if the received contractor identifier is verified by the remote server device, the program instructs the mobile device to:
   establish communication between the mobile device and the first building device; and
   communicate at least some of the configuration information to the first building device.

4. The non-transitory computer-readable storage medium of claim 1, wherein the program further instructs the mobile device to:
- establish communication between the mobile device and the remote server device; and
- communicate at least some of the configuration information to the remote server device.

5. The non-transitory computer-readable storage medium of claim 1, wherein the program further instructs the mobile device to:
- receive a building device identifier from the first building device; and
- communicate the building device identifier to the remote server device.

6. The non-transitory computer-readable storage medium of claim 5, wherein the program further instructs the mobile device to associate the received contractor identifier with the building device identifier.

7. The non-transitory computer-readable storage medium of claim 1, wherein if the received contractor identifier is verified by the remote server device, the program instructs the mobile device to:
- receive WiFi configuration information from the first user of the mobile device via the one or more contractor configuration screens;
- establish communication between the mobile device and the first building device; and
- communicate the WiFi configuration information to the first building device to connect the first building device to an existing WiFi network in the building.

8. The non-transitory computer-readable storage medium of claim 7, wherein the program further instructs the mobile device to:
- establish communication between the mobile device and the remote server device; and
- communicate at least some of the configuration information to the remote server device, so that the remote server device can communicate the configuration information to the first building device at least in part via the existing WiFi network.

9. The non-transitory computer-readable storage medium of claim 8, wherein the program further instructs the mobile device to:
- receive a building device identifier from the first building device at the mobile device; and
- communicate the building device identifier to the remote server device for associating the contractor identifier with the first building device.

10. A mobile device for interacting with a building device that is installed in a building, comprising:
- a user interface including a display;
- a memory for storing an executable program;
- a controller operatively coupled to the user interface and to the memory, the controller configured to:
  - receive, from a first user of the mobile device, configuration information comprising a plurality of configuration settings for configuring a first building device to control a first Heating, ventilation, and/or air conditioning (HVAC) system, wherein the plurality of configuration settings includes an identification of a type for the first HVAC system;
  - save, at a remote server in response to an input from the first user at the mobile device, the plurality of configuration settings for configuring the first building device to control the first HVAC system as a first configuration profile;
  - receive, from the first user of the mobile device, an indication that the first user is a contractor;
  - in response to receiving the indication, display on the display of the mobile device a screen configured to accept a contractor identifier from the first user of the mobile device;
  - receive the contactor identifier from the first user via the user interface of the mobile device when displaying the screen that is configured to accept the contractor identifier;
  - send, via an internet connection, the received contractor identifier to the remote server device for verification;
  - receive from the remote server device, via the internet connection, an indication of whether the received contractor identifier is verified or not;
  - in response to the received contractor identifier being verified by the remote server device, provide access to one or more contractor configuration screens for configuring a second building device to control a second HVAC system and provide access to one or more customer screens for interacting with the second building device on the display of the mobile device, wherein the one or more contractor configuration screens comprise screens not available to a user without a verified contractor identifier, wherein the one or more contractor configuration screens comprise a screen for selecting a previously saved configuration profile from a list of one or more previously saved configuration profiles, wherein the list of one or more previously saved configuration profiles includes the first configuration profile;
  - in response to the first user selecting the first configuration profile, loading the plurality of configuration settings for configuring the first building device to the second building device to configure the second building device to control the second HVAC system; and
  - in response to not receiving an indication from a second user that the second user is a contractor, provide access to the one or more customer screens on the display of the mobile device for operating the second building device to the second user, but not access to the one or more contractor configuration screens to the second user.

11. The mobile device of claim 10, wherein the one or more of the contractor configuration screens are in addition to the one or more customer screens.

12. The mobile device of claim 10, wherein one or more of the contractor configuration screens allow the first user to send an invite to a customer to complete the configuration of the second building device.

13. The mobile device of claim 10, wherein the controller is further configured to:
- in response to the first user selecting the first configuration profile, present to the first user a configuration screen showing a summary of parameters for the first configuration profile, wherein the configuration screen enables the first user to edit the parameters for the first configuration profile.

* * * * *